US011750609B2

(12) United States Patent
Gilpin et al.

(10) Patent No.: US 11,750,609 B2
(45) Date of Patent: Sep. 5, 2023

(54) DYNAMIC COMPUTING RESOURCE ACCESS AUTHORIZATION

(71) Applicant: CyberArk Software Ltd., Petach-Tikva (IL)

(72) Inventors: Kevin Gilpin, Weston, MA (US); Brian Kelly, Waltham, MA (US)

(73) Assignee: CYBERARK SOFTWARE LTD., Petach-Tikva (IL)

( * ) Notice: Subject to any disclaimer, the term of this patent is extended or adjusted under 35 U.S.C. 154(b) by 398 days.

(21) Appl. No.: 15/963,225

(22) Filed: Apr. 26, 2018

(65) Prior Publication Data

US 2018/0316676 A1 Nov. 1, 2018

Related U.S. Application Data

(60) Provisional application No. 62/491,375, filed on Apr. 28, 2017, provisional application No. 62/491,381, filed on Apr. 28, 2017.

(51) Int. Cl.
*H04L 9/40* (2022.01)
*H04L 9/08* (2006.01)

(52) U.S. Cl.
CPC .............. *H04L 63/10* (2013.01); *H04L 9/088* (2013.01); *H04L 9/0891* (2013.01); *H04L 63/102* (2013.01); *H04L 63/20* (2013.01)

(58) Field of Classification Search
CPC . H04L 63/10–108; H04L 63/20; H04L 9/088; H04L 9/0891; G06F 21/62
See application file for complete search history.

(56) References Cited

U.S. PATENT DOCUMENTS

| | | | |
|---|---|---|---|
| 9,774,586 B1* | 9/2017 | Roche | H04L 63/08 |
| 9,853,979 B1* | 12/2017 | Roth | H04L 63/10 |
| 2005/0021978 A1* | 1/2005 | Bhat | G06F 21/6227 713/182 |
| 2016/0087964 A1* | 3/2016 | Irving, Jr. | H04L 63/12 726/4 |
| 2016/0105283 A1* | 4/2016 | Mityagin | H04L 9/12 380/279 |
| 2020/0195649 A1* | 6/2020 | He | H04L 63/20 |

* cited by examiner

*Primary Examiner* — D'Arcy Winston Straub
(74) *Attorney, Agent, or Firm* — Finnegan, Henderson, Farabow, Garrett & Dunner, LLP

(57) ABSTRACT

Techniques include receiving an access notification identifying a request by an identity for access to an access-protected network resource; identifying a configurable and multi-dimensional policy defining rights of the identity to access the access-protected network resource with respect to the operation of the access-protected network resource; automatically determining, based on the configurable and multi-dimensional policy, whether to perform at least one of: permitting the identity to access the access-protected network resource; denying the identity to access the access-protected network resource; or rotating a secret associated with the identity.

22 Claims, 12 Drawing Sheets

US 11,750,609 B2

DYNAMIC COMPUTING RESOURCE ACCESS AUTHORIZATION

REFERENCE TO RELATED APPLICATIONS

This application claims the benefits of priority from U.S. Provisional App. No. 62/491,375, filed on Apr. 28, 2017 and titled "Policy-Defined Access Control in a Cloud Computing Environment," and U.S. Provisional App. No. 62/491,381, filed on Apr. 28, 2017 and titled "Secret Rotation in a Cloud Computing Environment," both of where are hereby incorporated by reference in their entirety.

BACKGROUND

Cloud computing is a popular technique for delivering various services to users. Cloud computing allows for infrastructure flexibility, fast deployment of applications and data, cost control, and adaptability. Cloud services customers are able to utilize the increased efficiency and resources of a distributed network. Cloud computing allows users to remotely access a resource (i.e. virtual server, database, program, or application) stored in the cloud on different devices and/or in different geographic locations at the same time.

However, Cloud Service Providers (CSPs) such as Amazon™ and Google™ provide physical hardware such as servers and other equipment to host products and services from a remote location. Cloud service customers purchase the infrastructure necessary for their needs, but never need to purchase or setup physical equipment. Infrastructure services, such as virtual servers, are provided by using software running on one or more real machines. Such virtual servers do not physically exist and can therefore be moved around and scaled up or down on the fly without affecting the end user.

Access to cloud resources is managed through permissions, secrets and other tools such as usernames and passwords, keys, and other credentialing information. Current and prior access control systems lack some of the flexibility and protections that would enhance management and customization of access.

SUMMARY

The disclosed embodiments describe non-transitory computer readable media and methods for providing access control in a network environment. For example, in an exemplary embodiment, there may be a non-transitory computer readable medium including instructions that, when executed by at least one processor, cause the at least one processor to perform operations for dynamically providing access control in a network environment. The operations may include receiving an access notification identifying a request by an identity for access to an access-protected network resource; identifying a configurable and multi-dimensional policy defining rights of the identity to access the access-protected network resource with respect to the operation of the access-protected network resource, the configurable and multi-dimensional policy specifying: a plurality of access-protected network resources, including the access-protected network resource; a policy owner capable of configuring the configurable and multi-dimensional policy; a plurality of policy variables; and a plurality of permissions corresponding to the plurality of variables; and automatically determining, based on the configurable and multi-dimensional policy, whether to perform at least one of: permitting the identity to access the access-protected network resource; denying the identity to access the access-protected network resource; or rotating a secret associated with the identity.

According to a disclosed embodiment, the identity and the access-protected network resource operate in a zero-trust secret management environment.

According to a disclosed embodiment, the configurable and multi-dimensional policy further specifies a group to which the identity belongs.

According to a disclosed embodiment, the configurable and multi-dimensional policy is stored as a declarative document.

According to a disclosed embodiment, the declarative document is at least one of a YAML file, a JSON file, or an XML file.

According to a disclosed embodiment, the policy owner is an administrator identity.

According to a disclosed embodiment, the operations further comprise rotating the secret associated with the identity according to a defined rotation schedule.

According to a disclosed embodiment, the access notification requests a particular type of access to the access-protected network resource.

According to a disclosed embodiment, the particular type of access is at least one of read, modify, or delete.

According to a disclosed embodiment, the operations further comprise logging the determination of whether the identity should be permitted to access the access-protected network resource or denied to access the access-protected network resource.

According to a disclosed embodiment, the configurable and multi-dimensional policy is unique to the identity.

According to another disclosed embodiment, a method may be implemented for dynamically providing access control in a network environment. The method may include receiving an access notification identifying a request by an identity for access to an access-protected network resource; identifying a configurable and multi-dimensional policy defining rights of the identity to access the access-protected network resource with respect to the operation of the access-protected network resource, the configurable and multi-dimensional policy specifying: a plurality of access-protected network resources, including the access-protected network resource; a policy owner capable of configuring the configurable and multi-dimensional policy; a plurality of policy variables; and a plurality of permissions corresponding to the plurality of variables; and automatically determining, based on the configurable and multi-dimensional policy, whether to perform at least one of: permitting the identity to access the access-protected network resource; denying the identity to access the access-protected network resource; or rotating a secret associated with the identity.

According to another disclosed embodiment, the identity and the access-protected network resource operate in a zero-trust secret management environment.

According to another disclosed embodiment, the method further comprises maintaining a plurality of configurable and multi-dimensional policies for a plurality of different identities.

According to another disclosed embodiment, the plurality of configurable and multi-dimensional policies are categorized into a plurality of groups.

According to another disclosed embodiment, upon an instantiation of the plurality of different identities, the plurality of configurable and multi-dimensional policies are assigned to the plurality of different identities.

According to another disclosed embodiment, upon an instantiation of the plurality of different identities, each of the plurality of different identities is assigned a respective token.

According to another disclosed embodiment, the automatically determining is based on whether the respective tokens are valid.

According to another disclosed embodiment, the configurable and multi-dimensional policy is stored as a declarative document.

According to another disclosed embodiment, the declarative document is at least one of a YAML file, a JSON file, or an XML file.

According to another disclosed embodiment, the method further comprises rotating the secret associated with the identity according to a defined rotation schedule.

According to another disclosed embodiment, the access notification requests a particular type of access to the access-protected network resource.

Aspects of the disclosed embodiments may include tangible computer-readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings are not necessarily to scale or exhaustive. Instead, emphasis is generally placed upon illustrating the principles of the inventions described herein. These drawings, which are incorporated in and constitute a part of this specification, illustrate several embodiments consistent with the disclosure and, together with the detailed description, serve to explain the principles of the disclosure. In the drawings.

DETAILED DESCRIPTION

Figure 1:
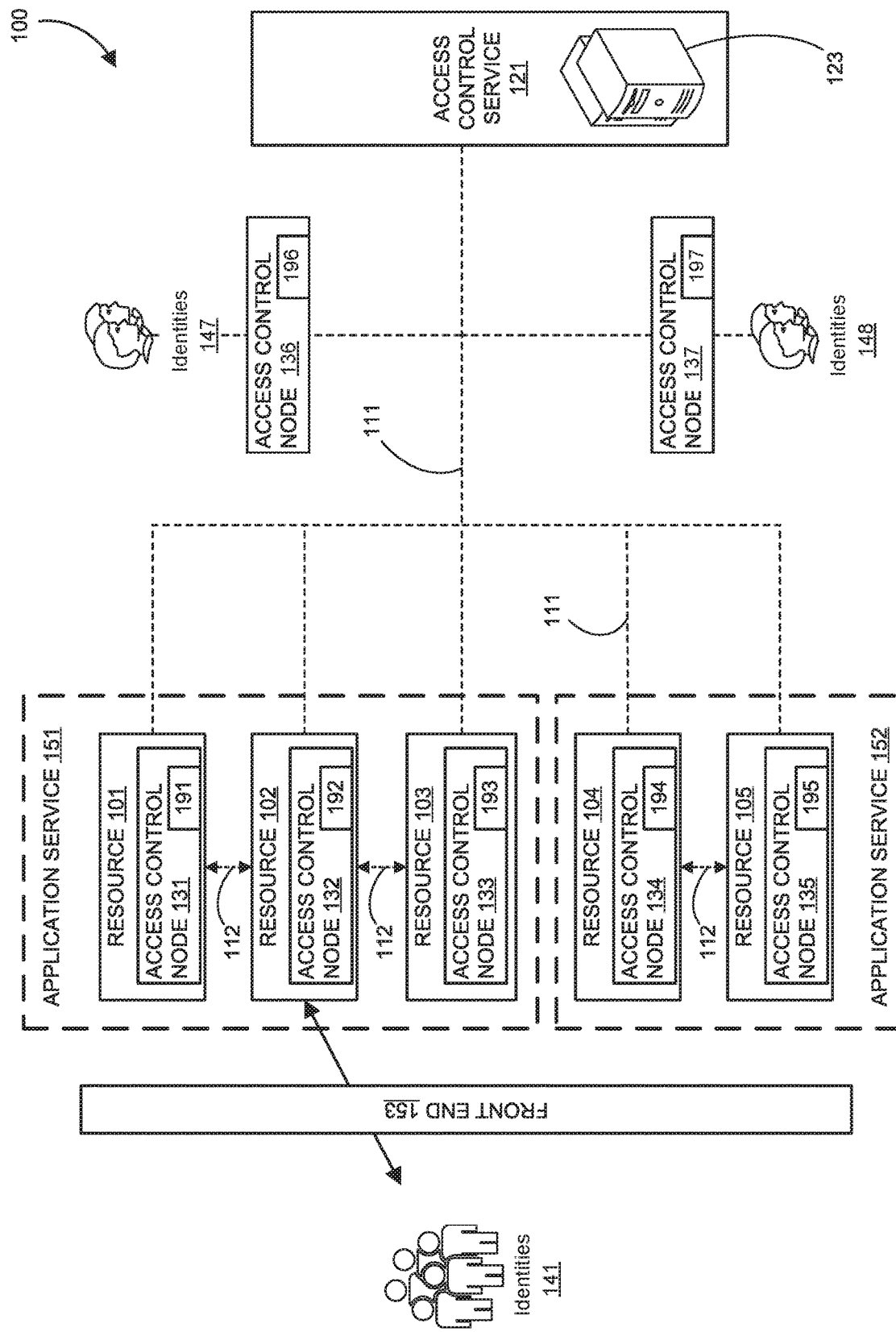
FIG. 1 illustrates a cloud computing environment to provide access control.

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence, nor constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

Implementations of a policy-defined access control system in a network environment, and implementations of such systems including secret rotation, disclosed and claimed herein, facilitate deployment of rules and definitions within an access control system and provide automatic expiration and regeneration of secrets used in these access control systems, typically stored and/or used in both an access control service module and in one or more targets (e.g., an application, virtual machine, container, database, resource or system that uses secrets employed by users, hosts and/or other entities interacting with the target).

Currently, secrets may either be stored as plain text within the source code or separately in configuration files. Secret management provides a way of managing secrets, thus increasing data security, and allowing an entity to meet data protection compliance requirements. Applications are more secure if they have a standardized interface for accessing secrets. A secret management system may employ one or more techniques for storing and handling secrets, such as encrypting secrets while in transit; encrypting secrets at rest; preventing secrets from leaking when consumed by the final application; and adhering to the principle of least-privilege, where an application only has access to the secrets that it needs.

Embodiments of the disclosed access control systems and secret management systems allow an entity or identity to define its security rules in declarative files (e.g., XML, JSON, YAML, etc.) that can be checked safely into source control. Disclosed embodiments describe flexible and convenient methods for describing policies (i.e., self-contained role-based access control (RBAC) models) and entitlements (i.e., roles and permissions which span all policies and global records) in text format.

In some embodiments, the access control system may receive an access notification identifying a request by an identity for access to an access-protected network resource. The system may identify a configurable and multi-dimensional policy defining rights of the identity to access the access-protected network resource. For example, a configurable and multi-dimensional policy may specify a plurality of access-protected network resources, including the access-protected network resource. The policy may be configurable by identities, such as network administrators or cloud managers. The policy may have an associated policy owner capable of configuring the configurable and multi-dimensional variables of the policy. The plurality of policy variables may include numerous different attributes, as discussed further below. Further, as discussed below, there may be a plurality of permissions corresponding to the plurality of variables. The system may automatically determine, based on the configurable and multi-dimensional policy, whether to permit the identity to access the access-protected network resource, deny the identity access to the access-protected network resource, or a rotate secret associated with the identity.

As described herein, a network environment may refer to any local access network environment, wireless access network environment, cloud computing network environment, or various other types of computing network environments. A network environment is composed of actors (e.g., identities), which may be either human (users who are either external to an access control system or are internal users) or nonhuman computing system resources (e.g., hosts such as web services, data servers, virtual machines, or any other part of the computing system). The actors, both human and nonhuman, may be given identities in the network environment. Human actors can be given, for example, a "user" identity, which can include a username, password, and Application Program Interface (API) key. Nonhuman actors (e.g., machines or code, automated devices, servers, applications, virtual machines or containers, etc.) can be given a "host" identity, which may include a login name and API key. Login, by an identity, to a network environment may be controlled with a combination of authentication (e.g., by public key) and authorization (e.g., by access control check), rather than by managing situation-specific public key lists. In some embodiments, a host production module may automatically create hosts and enroll them into one or more layers, also referred to as host groups in some systems. Layers may map logically to the groups of machines and code in a given cloud computing environment.

In one non-limiting example, a group of servers or VMs can be a layer. A cluster of containers which are performing the same function (e.g. running the same image) can also be modeled as a layer. In another non-limiting example, a script that is deployed to a server can be a layer. In a further example, an application which is deployed to a PaaS can also be a layer. Using layers to model the privileges of code helps to separate the permissions from an application's physical implementation. For example, if an application is migrated from a PaaS to a container cluster, the logical layers that compose the application (e.g., web servers, app servers, database tier, cache, message queue) can remain the same.

As used herein, an "identity" describes a natural or legal person (e.g., an individual or a company), a physical computing resource (e.g., a server or computing device, etc.), or a logical object (e.g., a database, a network account, an application, IP address, an endpoint, etc.) associated with certain rights, services, credentials, and/or descriptive information in the context of a cloud-computing environment. For example, a cloud-computing environment can associate an identity with a computing device, another identity with a user of the device, and an additional identity with an application running on the computing device. A cloud-computing environment can be configured to maintain an identity as stored data and/or instructions. In some embodiments, an identity is a user account on a network resource.

As used herein, an access token refers to data and/or instructions enabling an identity to access a cloud-computing environment. For example, an access token can include credentials (e.g., a user name or password) or keys (e.g., cryptographic). The cloud-computing environment can be configured to use an access token for authorization and/or authentication of an API communication. For example, Amazon Web Services™ defines access keys for making programmatic calls to Amazon Web Services™ Application Programming Interface Operations. Access keys can include an access key id and an access key value, as well as potentially other information. Access keys can be used to sign programmatic requests made to an Amazon Web Services™ cloud-computing environment. Of course, other cloud-computing environments (e.g., Microsoft Azure™, IBM Cloud™, etc.) may be used as well.

The access control service may provide access control checks at any point in an access control infrastructure (in some implementations also referred to as an access control environment, or being contained within such an access control environment). Using the access control service, authorized users and hosts may define and enforce access control rules (e.g., through the implementation of policies or the like). The access control service may maintain a directory or catalog of identities, resources, and permissions, and can manage read and write access to protected information (e.g., encrypted information). In some embodiments, entities can program, scale, and customize access control to suit their needs. For example, a large entity may customize an access control service based on number of employees, number of network resources, and sensitivity of controlled data. An entity may also be able to, for example, give identities permissions based on the identity's length of employment, department within the entity, network resource usage, etc. Because the access control service can be implemented as a non-vendor specific service, it is compatible across cloud computing and network environments.

In some embodiments, the access control service may manage "roles" (e.g., "admin" and "non-admin" roles) assigned to identities in the network environment. In a role-based access control (RBAC) system, permissions define the actions a role may be allowed to be performed on a network resource and can be assigned to roles in the context of a particular resource. Permissions models may govern access to access-protected network resources, such as secrets like database credentials, keys and passwords, in a uniform manner for users and hosts. As used herein, access-protected network resources are protected assets within an access control system that each possess a unique identifier (a resource ID). Rather than being defined directly, network resources may be defined by records that behave like network resources (e.g., users, groups, hosts, layers, variables, webservices, and possibly others). Non-limiting examples of network resources include database passwords, virtual machines and servers (e.g., for secure shell (SSH) management), and webservice endpoints. Network resources may be annotated with key-value pairs to facilitate organization and discovery through searching and display (e.g., using an access control system user interface).

The purpose of a role may be to possess privileges and to initiate transactions in a network environment. A role may represent a user, a person, a group, a host (such as a virtual machine or process), or a group of other roles. In addition to privileges being granted to a role, a role may be granted to another role so that the receiving role gains all the privileges of the granted role. In addition, the receiving role may gain all the roles which are held by the granted role (i.e., role grants are fully inherited). In some embodiments, roles are not defined directly. Rather, records that behave as roles, such as users, groups, hosts and layers may be used instead. A group can be a collection of users and/or other groups. When a user becomes a member of a group, the user is granted the group role and thus inherits the group's privileges. Because groups can also be members of groups, they may be organized and nested in a hierarchy.

Examples of permissions that may be assigned to roles include "create," "read," "execute," "update," and "delete." For example, the role "admin" may be assigned permissions to "create," "read," "execute," "update," and "delete" on a network resource (e.g., a server or digital document), while the role "non-admin" may be assigned permissions to "read," "execute" and "update" on a network resource. In some embodiments, permissions may be granted by roles to other roles using a "can grant" option. For example, a role may have "can grant" permissions and thus may be able to grant one or more permissions to another role. Additionally, "read-only" access may be provided via a system of replication or the like. Roles may be granted to actors and/or groups. By modifying the permissions assigned to a role, the permissions may be changed for all actors/groups possessing or utilizing that role.

The access control service may provide dynamic host registration. An automated host registration system may create and manage identities for hosts. For example, the access control service may create and manage identities for hosts automatically, without human intervention, when such hosts are spun up and down as needed within various systems. The automated host registration system may be granted limited ability to manage other hosts (e.g., by an administrator). The management permissions granted to the automated host registration system might be constrained to a specific security domain or layer.

In some embodiments, the access control service may provide auditing and permissions reporting. In some embodiments, the access control computing system (e.g., comprising one or more processors, servers and/or other hardware) may generate a permanent record of system activity. For example, a record of system activity may include both approved and denied actions to comply with government regulations, industry standards, and/or internal policies. Permanent records of activity may be transferred back to a central collection point. In some embodiments, the permanent records are transferred "out-of-band" via a cloud data plane (e.g., message queue service).

FIG. 1 is a system diagram illustrating an exemplary network environment 100. Cloud computing environment 100 may be configured for performing policy-defined access control and secret rotation, as well as providing access control among and between network resources, hosts, and identities. Network resources (e.g., 101, 102, 103, 104, 105), hosts (e.g., 151, 152), and identities (e.g., 141, 147, 148) may be internal or external to environment 100, and may be, for example, end-users, system personnel, or other identities, as described above. Environment 100 may include an infrastructure according to one or more implementations described herein, such as an on-premises LAN network, public cloud network, private cloud network, hybrid cloud network, etc. Using implementations of policy-defined access control disclosed and claimed herein, a network environment may be defined by one or more elements, including policies, users, groups, hosts, layers, variables, webservices, role grants and permission grants. Using these elements and representational state transfer (REST) functions, identities may authenticate, search, fetch secrets, perform permission checks, and fetch public keys in network environment 100.

Role-based access control (RBAC) systems provide scalable implementations of access control systems through the use of role delegation and may be available in a variety of forms (e.g., Docker container, Amazon Machine Image™, RPM installer, etc.). Such implementations may be used to, among other things, (a) define privileges on machines, webservices and secrets; (b) delegate management to subsets of infrastructure to human users; (c) automatically rotate secrets (including SSH private keys); distribute SSL certificates to internal and external servers; (d) securely and automatically enroll new machines into controlled environments; (e) control web service traffic between services; (f) manage and distribute public keys; (g) distribute database passwords (and other credentials) to applications and services; and (h) provide authorization logic for configuration management and container orchestration.

In some embodiments, network environment 100 may be a cloud computing environment and may include one or more identities (e.g., end-users 141 and internal users, e.g., personnel users 147, 148), application services 151, 152, access control service 121, network resources 101-105, access control nodes 131-137, access control communication system 111, and communication links 112.

Access control service 121 may include one or more servers 123, and software and/or other modules to perform the operations described herein, and in some embodiments may include nodes 131-137. Access control nodes 131-137 may include policy-defined access control and/or secret rotation modules 191-197, which may work together as part of an access control system. Access control service 121 may store one or more configurable and multi-dimensional policies specifying a plurality of access-protected network resources (e.g., one or more of network resources 101-105), policy owners (one or more personnel 147, 148 identities), policy variables, and policy permissions. As discussed above, an identity may refer to any person, account, network resource, or entity attempting to access an access-protected network resource. For example, identities may be one or more of network resources 101-105, individuals in the group of end-users 141, or individuals in the group of personnel 147, 148.

End-user identities 141 may be external users of one or more applications operating in the application services 151, 152. In one non-limiting example, application service 151 may be an e-commerce website and an end-user identity 141 may be a customer accessing the website to make purchases. In this example, personnel 147, 148 may be the employees of the e-commerce website who update the website and/or add new products to the website.

In another non-limiting example, application service 152 may be a healthcare application. An end-user 141 may be a customer signing up for healthcare insurance and personnel 147, 148 may be external or internal employees of the healthcare provider. For example, an external employee may be a contractor, consultant, or other external employee. In yet another non-limiting example, application service 151 may be a financial application, such as a banking website, online stock trading website, or 401(k) and Retirement Administration services website. In this example, end-user 141 is a customer of the bank, online stock trading service, or 401(k) company. Personnel 147, 148 may be employees of the financial entities hosting their services in the cloud.

Access control service 121 may provide and manage access control over interactions between identities (e.g., users 141, 147, 148) and network resources (e.g., 101-105). Application services 151, 152 may be hosted by network resources, such as server computers, rack servers, web servers, cloud computing platforms, and data center equipment, as well as any other type of physical or virtual server machine, and any variation or combination thereof. End-users 141 may access application services 151, 152 via an appropriate front end 153 interface using a computer, laptop, mobile device, smartphone, tablet, or some other computing device. Personnel 147, 148 may interact with application services 151, 152 and associated network resources 101-105 using computing devices, such as personal computers, computers, laptops, workstation equipment, processing systems, and the like.

Figure 12:
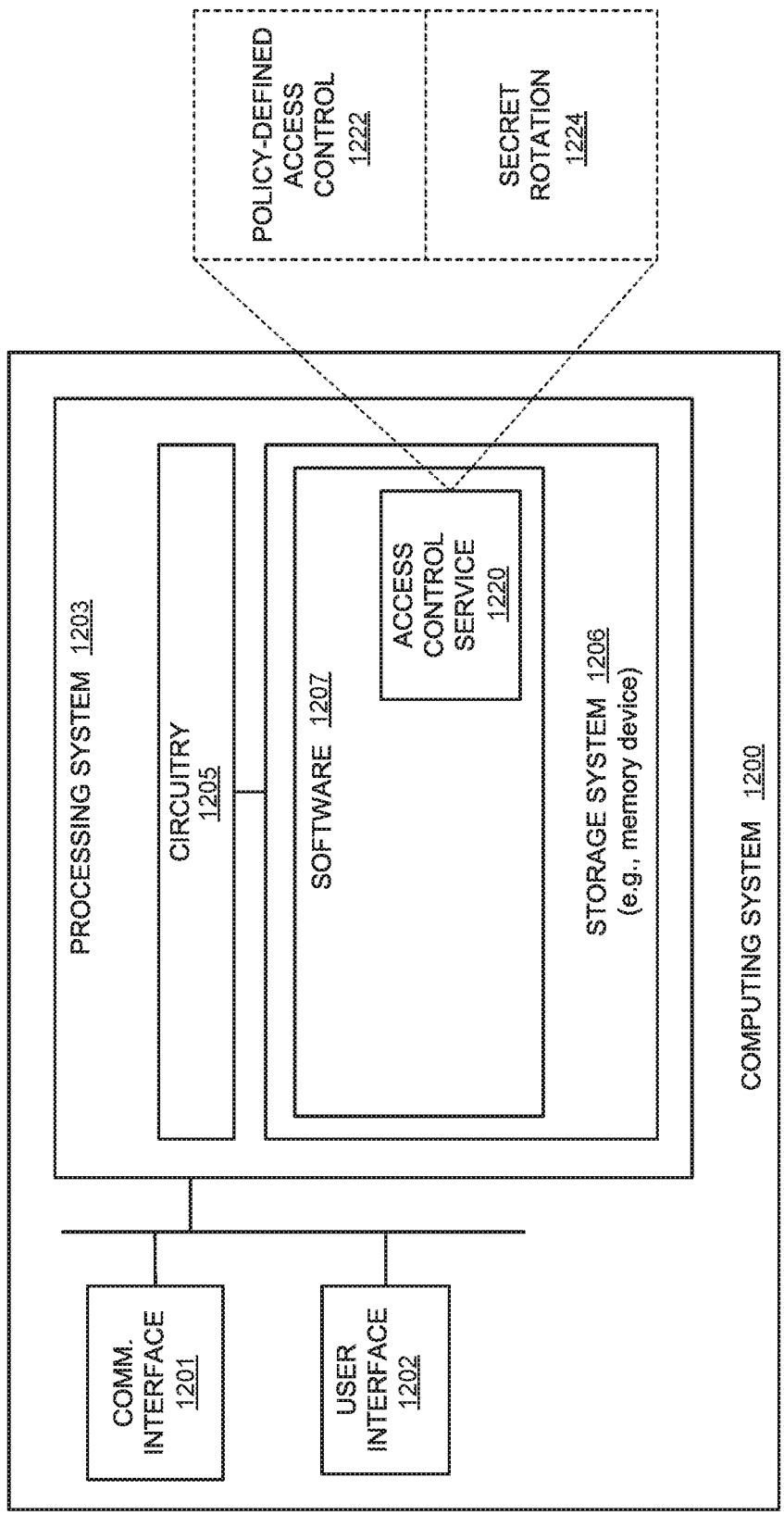
FIG. 12 illustrates an example of a computing system in accordance with disclosed embodiments.

As discussed further below, FIG. 12 provides an exemplary computing system suitable for implementing access control service 121, as well as one or more of the access control nodes and/or other components illustrated in FIG. 1 and the Figures that follow. In some embodiments, network resources 101-105 may be hosted in multiple network environments. In some embodiments, access control service 121 may use a central dashboard (further described below with reference to FIG. 3) that may manage various access controls (e.g., cloud identities, database passwords, and system accounts) across network environments. Furthermore, access control service 121 may integrate with a variety of different types of vendor-specific cloud and/or network systems providing the identity with a uniform system to manage access control.

Application service 151 may include network resources 101-103 (the description of service 151 and its resources applies analogously to application service 152 and its resources 104-105). Examples of application service 151 and/or application service 152 may include an e-commerce website, a health insurance application, a banking service, a database, a web development system, an IoT system, a cybersecurity monitoring or analysis system, a home automation system, a vehicle infotainment system, as well as various other types of application services. Resources 101-103 may include access control nodes 131-133, respectively (likewise, resources 104-105 of service 152 may include access control nodes 134-135, respectively).

Access control nodes 131-137 may monitor the respective network resources for operations and/or requests, and communicate with access control service 121 to determine whether a requested operation is permitted. Non-limiting examples of operations include access requests (e.g., a network resource requesting access to another resource, a user (end-user or personnel) requesting access to a network resource), replication, user authorization and/or authentication, and any other operations that can be performed in the environment. Access control nodes 131-137 may monitor for various types of operations between system actors and/or components (e.g., between network resources and between network resources and users/personnel).

Network resources 101-103 may communicate with each other via a wired or wireless connection using communication links 112. Although shown as separate entities, access control service 121 and network resources 101-103 may be located in a single device or distributed across multiple devices, cloud systems, and/or other systems. Examples of network resources 101-103 include computers, physical servers, virtual machines, virtual servers, applications, shared data resources, and shared databases. The descriptions, examples, and functions of application service 151 as described herein are also applicable to application service 152, network resources 104, 105, access control nodes 134, 135, and secret rotation modules 194, 195.

In some embodiments, access control service 121 provides access control between network resources 101-103 themselves (e.g., operations driven by network resources) and also between network resources 101-103 and personnel 147, 148 (e.g., human driven operations) in network environment 100. Access control service 121 may allow the identity running application service 151 to define how network resources 101-103 interact with each other and how users 141 and personnel 147, 148 interact with network resources 101-103, in addition to other aspects of application service 151.

In some embodiments, access control service 121 may receive a request to perform an operation. The request may be transmitted from network resources 101-103 (e.g., acting as hosts) or identities 141 and 147, 148. Examples of operations include accessing a virtual server or container, accessing a shared database, accessing an application, performing an IoT operation, replicating a virtual server/machine, and authorizing identities to perform operations, among various other possibilities. In some embodiments, access control service 121 determines whether the requested operation is permitted. If the requested operation is permitted, access control service 121 may provide the credentials required to perform the requested operation. In some examples, access control service 121 may also provide auditing or reporting functionality. Access control service 121 may generate a permanent record of all actions, e.g., approved/denied operations.

In an example, network resource 101 may attempt to access network resource 102. When network resource 101 requests access to network resource 102, access control node 131 may detect the access request and communicate with access control service 121 to determine whether the access request is permitted (e.g., in accordance with a policy, as discussed further below). If network resource 101 is permitted to access network resource 102, then access control service 121 provides the credentials required to access network resource 102 to network resource 101. Alternatively, network resource 101 may check the response from access control service 121, and continue the operation if the response is positive, i.e., access is granted. Access control service 121 may generate a record of the access requests from network resource 101.

In other examples, identities 147, 148 may wish to access network resource 101. For example, a user in the group of personnel 147 may request access to network resource 101 in order to update the drivers. The user may request access to network resource 101 through access control node 134. Access control node 134 may receive the request and communicate with access control service 121. Access control service 121 determines that a user in the group of personnel 147 is permitted to access resource 101. For instance, access control node 134 may authenticate and authorize personnel 147 using a username and password. Once permission is granted, access control node 134 may access resource 101 for personnel. In other examples, access control node 134 may provide personnel 147 with credentials that personnel uses to access resource 101. The issued credentials may be temporary or one-time use. In some embodiments, access control 121 generates a record of the access request.

Figure 2:
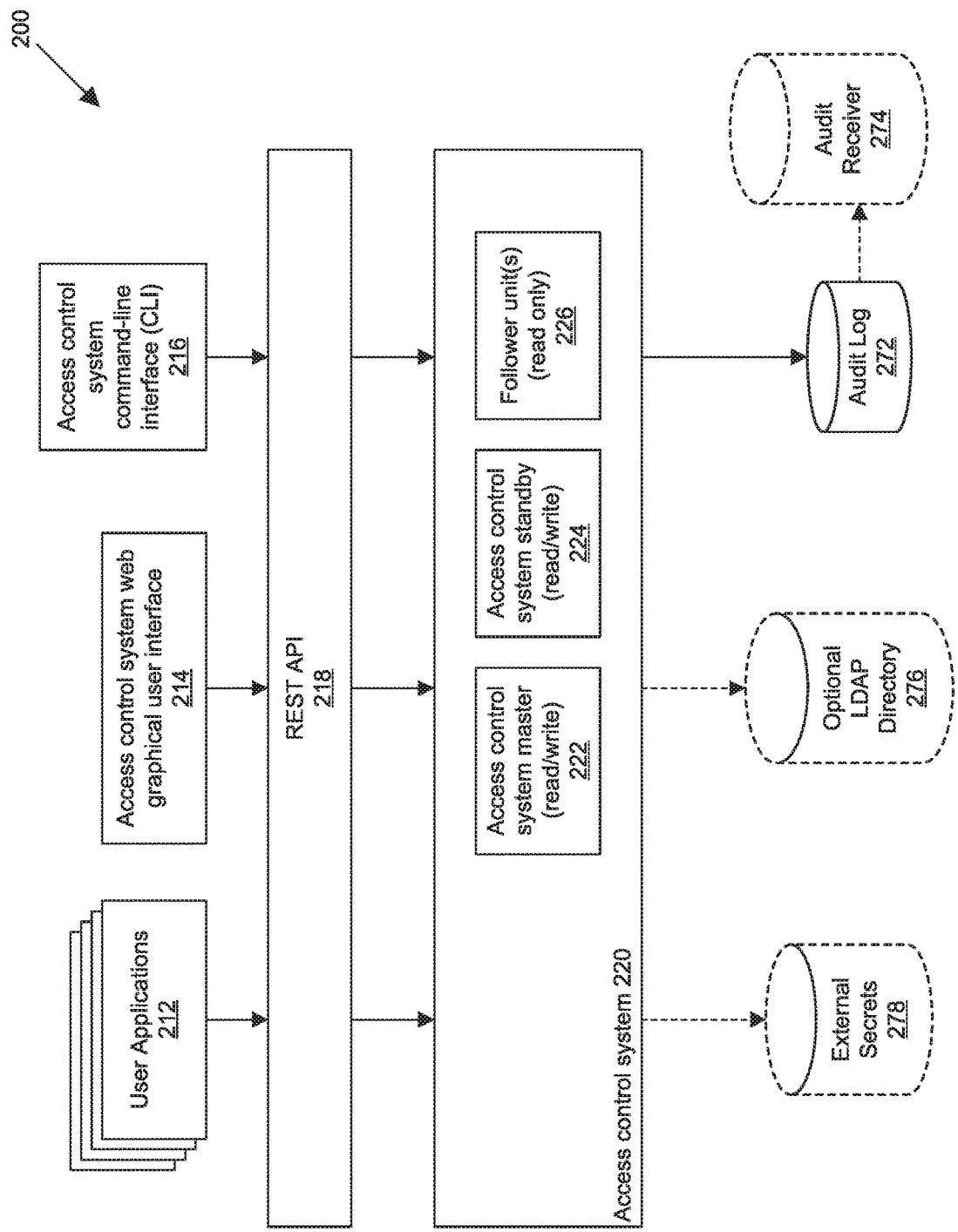
FIG. 2 illustrates a cloud computing environment to provide access control.

FIG. 2 illustrates a system for implementing an access control service, e.g., access control service 121, in a cloud computing environment 200 in which user applications 212 may access or otherwise interact with access control system 220 via an application programming interface (e.g., REST API 218). Identities may likewise interface with access control system 220 via the REST API 218 using a user interface 214 (e.g., a graphic user interface and/or other interface modes), as can an access control system command-line interface (CLI) 216. In some embodiments, certain identities but not others may be permitted to access the access control system 200. For example, with reference to FIG. 1, identities 147, 148 may have such access rights while identity 141 may not.

In some embodiments, access control system 220 may be configured to operate according to one or more implementations described herein and may include an access control system master control unit 222 (e.g., one or more servers, one or more processors, and/or other hardware providing access control service) that can read and write to user applications 212 and to other components in environment 200. For example, access control system master 222 may be configured for accessing resources 101, 102, 103, 104, 105, exchanging data with them, and modifying data or applications associated with them. Further, access control system master 222 may be configured for accessing resources including external secrets database 278, Lightweight Directory Access Protocol (LDAP) directory 276, and audit log 272. In some embodiments, a master standby 224 may also be used to provide a backup to master control unit 222. One or more follower units 226 may provide read-only operations to support operations of the system 220.

In some embodiments, operations, data, transactions, and other relevant historical information may be recorded as audit data and stored in an audit log 272 (which may be internal to or external to system 220). Audit log 272 may provide audit data to an audit receiver 274 in some implementations. Audit receiver 274, for example, may function to expert audit data from audit log 272 to other resources (e.g., performance monitoring resources, business analytics systems, quality control systems, government reporting systems, etc.). A LDAP directory 276 may also be provided for use by system 220. In some embodiments, secrets may be stored externally in one or more isolated storage devices 278. Access control system 220 and/or one or more other constituent components of environment 200 may assist in policy-defined access control implementations and secret rotation.

Figure 3:
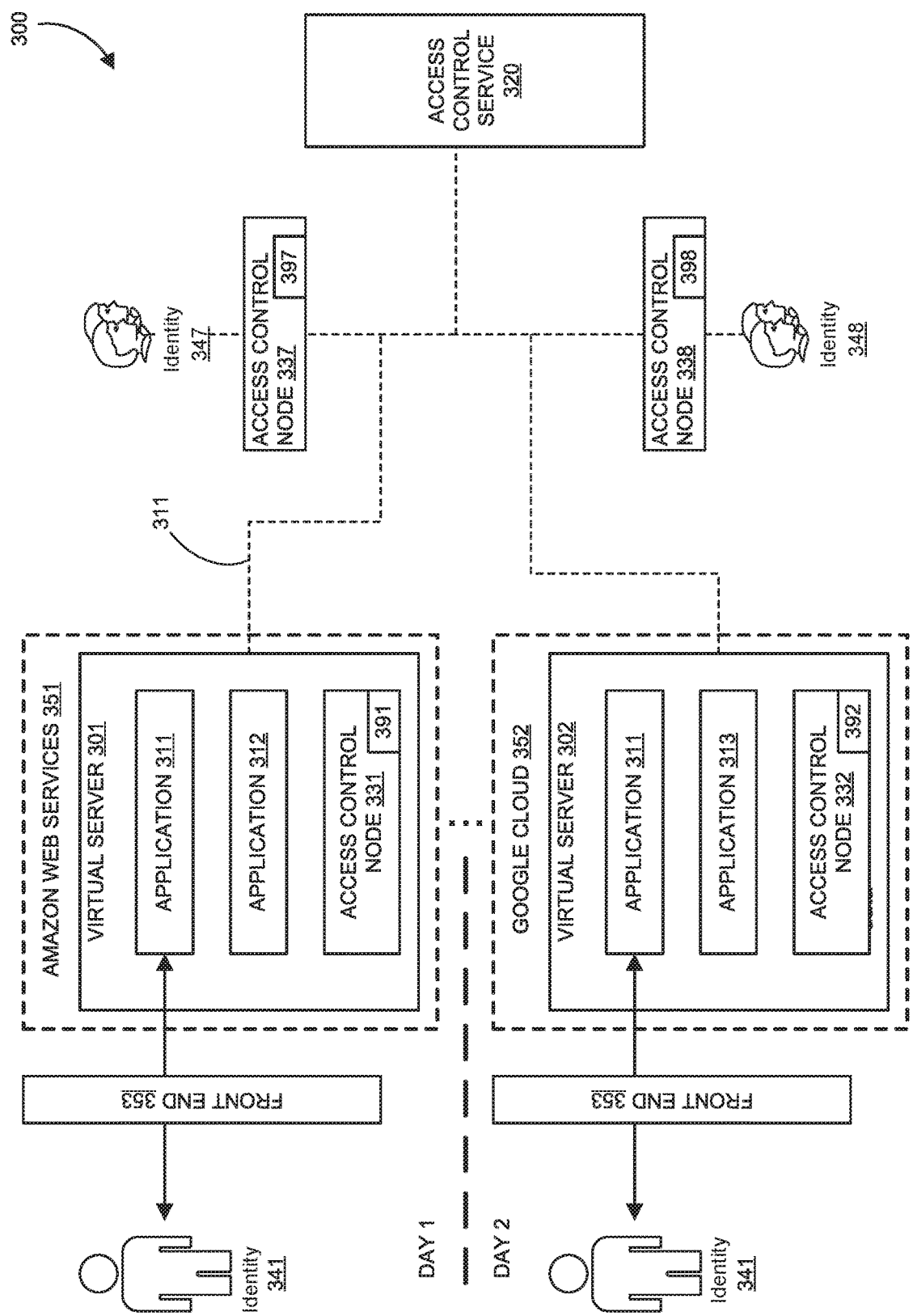
FIG. 3 illustrates a cloud computing environment to provide access control.

FIG. 3 illustrates another exemplary cloud computing environment 300 implementing access control service 320 that provides policy-defined access control in environment 300. An identity 341 may access applications 311, 312 in a virtual server 301 hosted by Amazon Web Services™ 351. An access control node 331 may be part of virtual server 301 and access control service 320. Identity 341 may access application 311 via front end 353 on a first day (e.g., to conduct banking or other activity). Identity 341 may then access application 311 on a subsequent day during which application 311 is made available as part of virtual server 302. Virtual server 302 may also include application 313 and access control node 332, which are provided to user 341 via front end 353 and hosted by Google Cloud™ service 352.

Identities 347, 348 (e.g., administrator users having access internally to the access control system 320) may access environment 300 via access control nodes 337, 338, respectively. Each access control node 331, 332, 337, 338 may include a secret rotation and/or policy-defined access control module 391, 392, 397, 398, respectively, to implement one or more secret rotation and/or policy-defined access control implementations described herein.

In an example, on day 1, identity 341 accesses application 311 on virtual server 301 hosted on AWS. On day 2, identity 341 accesses application 311 on virtual server 302 hosted on Google Cloud™. The operations of application 311 are the same across cloud computing hosts (e.g., servers 301, 302) in environment 300 and policy-defined access control may provide consistent access control and/or secret rotation across both services. On day 2, when identity 341 accesses application 311 on virtual server 302 in Google Cloud™, the identity's access rights are not required to be reconfigured. In some cases, end-user 341 may not be aware that application 311 accessed on day 2 is hosted in a different cloud computing host within environment 300. Similarly, personnel 347, 348 may have the same permissions in virtual server 301 hosted on AWS and virtual server 302 hosted on Google Cloud™. Secrets used in operating environment 300 may be updated and their complexity may be maintained as desired.

In some embodiments, an access control system policy may be used to define and implement rules to describe which users and services have privileges (e.g., to access machines and other hosts, or to get secrets like passwords and API keys). A policy may collect a set of records and permissions into a single scoped namespace with a common owner. For example, one or more policies may be stored in an internal and/or external database of access control service 320, access control system 220, or access control service 121. A policy may have standard attributes (e.g., an account, an owner, and an ID) and may have a body element that contains records owned by the policy, and permission and grant elements that apply to the policy records.

In some embodiments, a policy may be assigned a role. For example, the records declared in the body of the policy are owned by the policy role, so a role to which the policy role is granted inherits ownership of records, grants, and permissions defined in the policy. In some embodiments, a policy owner (e.g., an identity) may have an "admin" role, which is owned by a policy role and thus inherits ownership of the records, grants, and permissions defined in the policy. In this example, the identity assigned to the "admin" role may be enabled to access one or more access-protected network resources as defined by the inherited policy role.

In some embodiments, policies are self-contained and make no reference to records outside the policy. Thus, the policy may be loaded with different owner and namespace prefix options to serve different functions in a workflow. For example, a policy may be written and loaded into the access control system with full management assigned to a first namespace group (e.g., "developers") and may also be loaded into a second namespace group (e.g., "production" or "operations"), creating a production version of the same policy. In some embodiments, the production version may have different permissions, modification rules and/or other changes. For example, a policy loaded into a developer group, may allow access to a large number of network resources than a policy loaded into a production group.

In some embodiments, a policy may provide rules and may be loaded directly into an access control system, application, or the like in order to apply the description to identities and network resources within a network environment. The policy may be implemented as a declarative document (e.g., a document containing data, rather than code) so that loading a policy creates and/or updates an RBAC model inside the access control system without adversely affecting the execution of programs within the network environment. In some embodiments, a policy may be written using XML, JSON, YAML or another human-readable data serialization language. Documents in such a format may be easily generated and manipulated using an appropriate programming language, and may be idempotent, meaning a policy may be re-applied a number of times. Such properties make policies defined by human-readable data serialization languages automation-friendly.

The contents of a policy document may describe familiar objects (e.g., users and groups, hosts, and layers), and also other objects (e.g., webservices and host generated functions). Once a policy has been loaded into the access control system (e.g., using a command-line interface (CLI) such as CLI 216), a user may view the objects and role-based access controls via a user interface (UI), e.g., interface 214, and use an access control system application programming interface (API), e.g., REST API 218, to list and search the objects in the policy, perform audited permission checks, fetch and store secrets.

Policies may be used to create and configure various kinds of objects. Each object can be declared using a YAML tag (or tag using a different declarative document type) that indicates its type (e.g., !user, !host, !variable) and using an identifier (ID), which can be a unique identifier for the object among all the objects of its type (in some implementations, objects of different types can have the same ID). For example, a policy can declare a variable called "password" that is implemented and saved to the access control system. Loading the policy can then output any changes performed, for example showing actions that are being performed (e.g., at the end, a command can print any API keys for new roles created by a policy).

Figure 4:
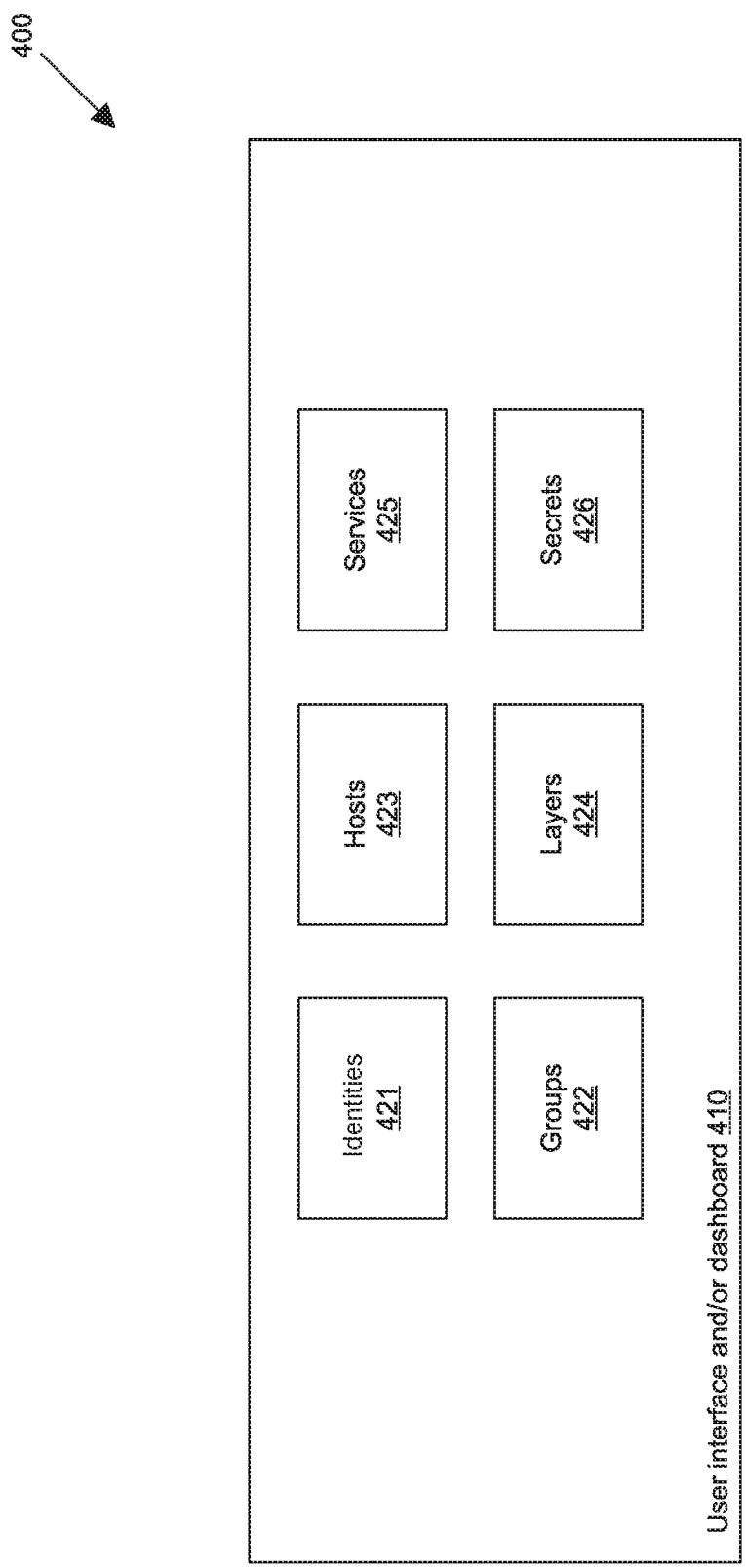
FIG. 4 illustrates a non-limiting example of a user interface configured for use in a cloud computing environment to provide access control.

FIG. 4 illustrates a user interface 400 that includes an interface or dashboard 410 configured to provide administrative personnel with graphic and/or other data pertaining to the operation of an access control system. In the non-limiting example of FIG. 4, an administrator may view and track statistical and other data relating to users 421, groups 422, hosts, 423, layers 424, services 425 and secrets 426. The information provided by dashboard 410 via interface 400 may include information about policy-defined access control and secret rotation implemented as described herein.

In some embodiments, once a policy is loaded in the access control system, an identity may view the objects (e.g., users or other identities 421, groups 422, hosts 423, layers 424, services 425, and secrets 426) and RBAC in an access control system user interface (UI) 410. User interface 410 may make resources visible by type, and use an access control system API to list and search the objects in the policy, perform audited permission checks, and fetch and store secrets. Some types of resources can be built into the system (e.g., variables, web services, users, groups, hosts, layers, etc.).

In some embodiments, annotations may be included in policies. For example, free-form name-value pairs using a path-like structure may add descriptions and metadata to access control system objects. The rights to create and modify annotations may be protected by RBAC. For example, an "update" privilege may be required to modify annotations and a "read" privilege may be required to view them. Annotations may be used by other users to better understand objects in the access control system and may also be used by code and scripts to perform custom operations such as scripted updates to the system (e.g. "fetch the audit history of every variable"). In some embodiments, if objects are tagged in cloud and container APIs, then similar practices may be used for access control system annotations.

Annotations may be set by including them in policies and, once loaded, the annotations may be available through the API and UI (subject to a "read" permission check).

In some embodiments, permissions may be defined for an object once the object has been loaded into the control access system. In some embodiments, access control system permissions are not controlled by the hierarchical nature of object IDs. Using ID names and path hierarchy, which are employed by some services, may not provide sufficient flexibility to manage large systems. Instead, the access control system may use RBAC to define and enforce permissions. For example, authorization questions may be presented in the form "does role X have privilege Y to resource Z?" also referred to herein as a transaction. Each transaction may include three or more parts, such as: a role, a privilege, and a resource. The role identifies the subject (who or what is acting); the privilege identifies an action; and the resource identifies an object upon which the subject is acting. Permissions may be defined in policies (e.g., using a "!permit tag" in a YAML policy, a "permit" tag in a JSON policy, a "<PERMIT>" tag in an XML policy, etc.).

In some embodiments, a role is an object that has permissions. In some embodiments, each user, host, group, and layer (i.e., group of hosts) is a role. A role may be declared in a policy, for example, using a corresponding tag such as a "!user tag" or a "!host tag" for a YAML policy, a "user" tag in an YSON policy, a "VARIABLE id=user" tag in an XML policy, etc. In some embodiments, roles may extend non-role objects (such as variables) with various behaviors. For example, a role may grant a non-role object permissions and may enable a non-role object to be granted to another object using a policy statement. Role grants are useful because they can create inheritance. For example, if a role grant for one identity or resource has been established, the same role grant may be applied to identities or resources that are created as subsidiary to, or identical to, the identity or resource.

Thus objects, annotations, permissions and roles may be declared together inside an organizing element called a "policy" that may organize related things (e.g., roles, privileges, resource identifications, and more) together, and may isolate permissions to or from different parts of the access control system. For example, a database layer and database credentials (username and password) may be created together in an exemplary YAML policy:

```
- !policy
    id: db
    body:
    - !variable
        id: username
        annotations:
        description: Administrative username to the database.
    - !variable
        id: username
        annotations:
        description: Administrative password to the database.
    - !layer
        annotations:
        description: Database cluster hosts belong to this layer.
```

The policy ID may also be a naming prefix (or "namespace") for objects defined inside the policy (e.g., the full ID of the username above is "db/username").

In the access control system (e.g., access control service 121, access control system 220, or access control service 320), each object may have an owner, which can be a role. The "owner" role may have all the permissions on the object and the ability to grant privileges to other roles.

Each application protected and/or regulated by the access control system may be represented by a policy and thus be registered with the access control system. Although each policy may look slightly different depending on the nature of the application, each policy may contain an owner (e.g., the user group that can fully administer it, such as a highly privileged security group or an application team), a layer (e.g., the application layer can be used to assign permissions that application hosts will need, including hosts added to the layer using grant statements so that they inherit the layer's permissions), one or more variables (e.g., secrets provisioned specifically for the application's use that can be declared in the policy, such as an SSL certificate and private key); and one or more permissions (e.g., if variables are defined in the policy, a permit statement can give the application layer permission to read and execute (fetch) those variables).

As a further example, an exemplary policy written in JSON is shown below:

```
"policy":
{
    "id": "pubkey/dan.smith",
    "body":
    {
        "variables":
        [
        {"id": "user"},
        {"id": "key"}
        ],
        "permit":
        {
            "role": "dan.smith",
            "privilege": "read,execute",
            "resource": "*variables"
        }
    }
}
```

The above exemplary policy defines permissions, e.g., read and execute, to an identity having a role "dan.smith." In this example, the individual identity pubkey/dan.smith is assigned a role, dan.smith, that may be unique to that identity. The above policy governs the access of the specified identity to network resources within the network containing the policy.

Similarly, an exemplary policy written in XML is shown below:

```
<POLICY id="pubkey/dan.smith">
    <VARIABLES>
        <VARIABLE id="user"/>
        <VARIABLE id="key"/>
    </VARIABLES>
    <PERMIT>
        <ROLE>dan.smith</ROLE>
        <PRIVILEGES>
            <PRIVILEGE>read</PRIVILEGE>
            <PRIVILEGE>execute</PRIVILEGE>
        </PRIVILEGES>
        <RESOURCE>variables</RESOURCE>
    </PERMIT>
</POLICY>
```

As in the example above, the policy grants read and execute permissions to the identity "pubkey/dan.smith." The above exemplary policies may be loaded to a network environment without impacting the execution of existing code.

Figure 5:
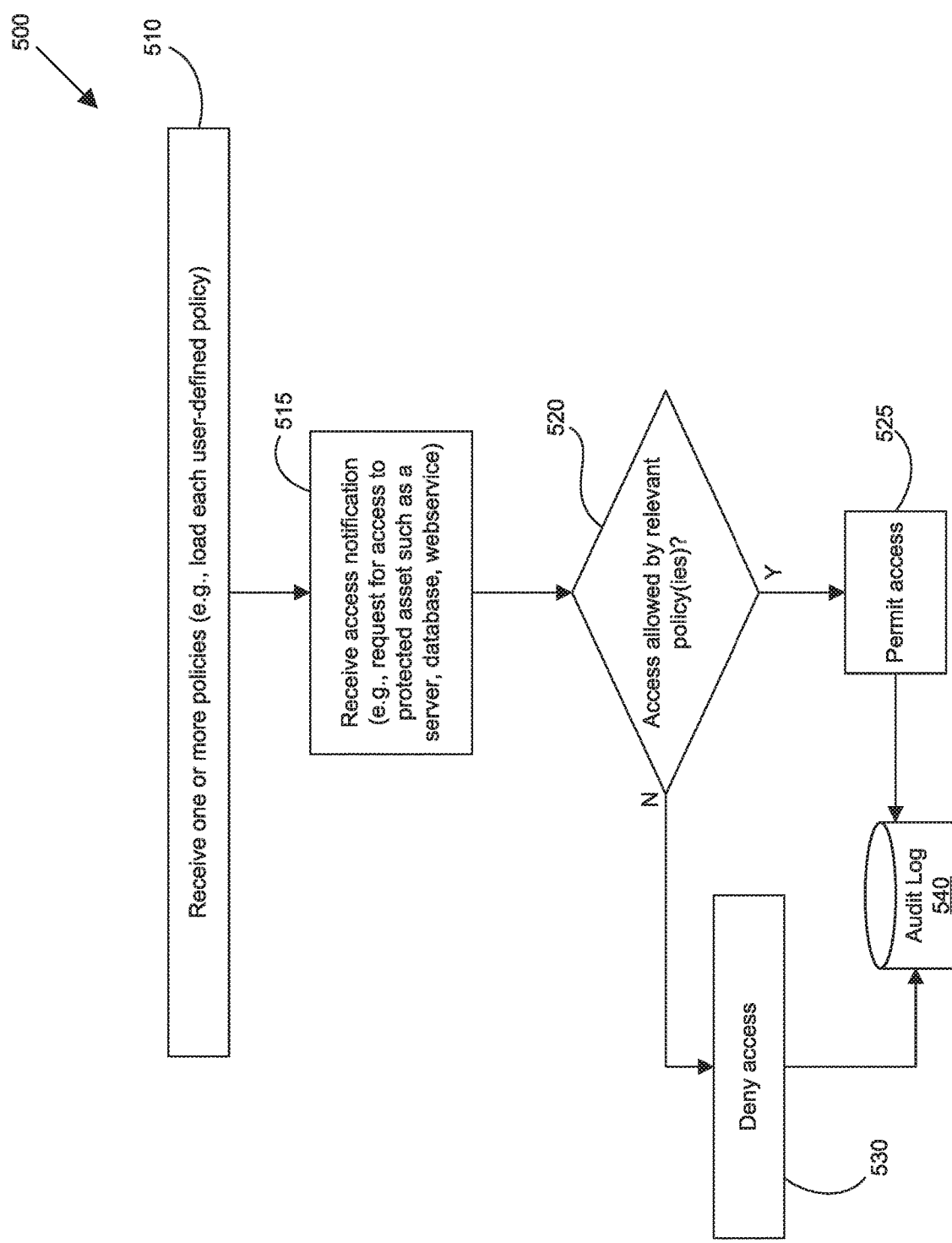
FIG. 5 illustrates a process of an access control system to provide policy-defined access control in a cloud computing environment.

FIG. 5 illustrates implementations of policy-defined access control process 500 as disclosed herein. Initially, a policy (e.g., defining an access control system object) may be received (e.g., loaded) by an access control system (510). In non-limiting examples, this policy may define and be constructed according to one or more implementations described herein and may be a declarative data document or the like (i.e., not code). The access control system then receives an access notification (515), which can be sent to an access control service from an access control node or the like and can include a request for access to a protected asset (e.g., resource) in the access control system such as a server, database, or webservice. If the entity requesting access is permitted the type of requested access (e.g., read, modify) by the relevant policy(ies), then (520) access is granted (525) and the event logged in an audit log 540. If the requested access is denied (530), then the appropriate constituent access control system components and/or actors may be notified and the denial likewise is logged in audit log 540. Additionally, an audit log 540 can be updated so that past secret values can be retrieved, if necessary, and to provide recordkeeping for compliance and/or other purposes. The process 500 of FIG. 5 can cover the various policy-defined access control implementations described herein.

Figure 6:
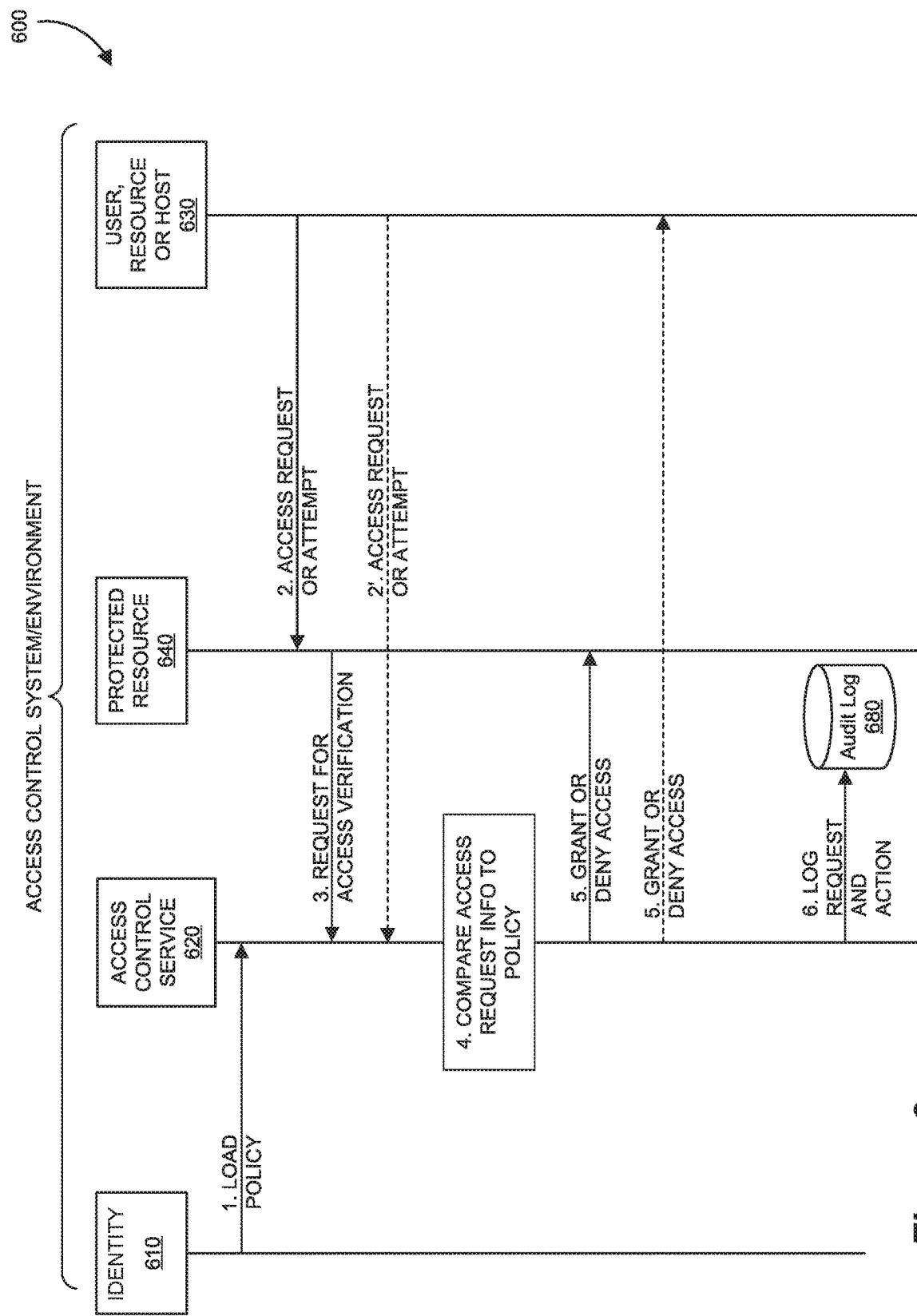
FIG. 6 illustrates operations in a cloud computing environment to provide policy-defined access control.

FIG. 6 illustrates an operation sequence 600 to illustrate an implementation in which the interactions between actors (an access control service, one or more resources and/or one or more users) of a cloud computing environment are managed by access control service 620. A user-defined policy (e.g., a declarative data document) is loaded by identity 610 into access control service 620. Access control service 620 then receives a request for access to a protected resource 640 either directly from an identity 630 (e.g., a user, resource, or host) or via an access verification request from protected resource 640 after an access attempt by identity 630. Access control service 620 then compares the access request information to any applicable policy(ies) that have been loaded concerning the subject matter of the access request and either grants or denies the request on that basis. Notification of the decision can be sent to the protected resource 640, the identity 630, or both. Information concerning the request and the decision can then be stored in an audit log 680 or the like. The process 600 of FIG. 6 can cover the various policy-defined access control implementations described herein.

When a new entity (e.g., a long-lived virtual machine or server) is spun up, the access control system may be instructed to create it as a new host and apply appropriate policies. A host production module running as a service on an access control system server can provide a management API for limited-time tokens, acting on a token holder's behalf to create new hosts in a cloud computing environment (e.g., environment 100 of FIG. 1, environment 200 of FIG. 2, or environment 300 of FIG. 3) to add them to a layer in the access control system (e.g., in a manner that removes dependency on human operators to correctly apply policies to each new host). The host production module can facilitate control and consistency of policies. For example, in some implementations hosts may inherit the policy of the layer they belong to, and the host production module may allow authorized users and services to create a new host and add it to an appropriate layer. Grouping hosts into layers allows an operator to maintain a consistent policy for every host on the layer and allows specific users and automated processes to add new hosts to the layer without giving permission to see or tamper with other hosts on that layer. When a new service is created, its policy may be applied according to its semantic meaning, represented by membership in a layer. In some embodiments, this step may be performed automatically, without the client having to remember to perform this step or having knowledge of the current policy.

In preparation to start new entities (e.g., servers, VMs, containers, etc.), an operator may create a layer to which such new hosts will belong and apply a policy to that layer that includes a host production module or other instantiation of host production control configured to generate one or more host production security tokens, each of which is represented by a securely random string of characters. The operator may communicate the tokens securely to the person or service that will be creating each new entity. The host production security token can include an expiration date (e.g., which a policy can specify), allowing the host production service factory to create customized tokens (e.g., short-lived tokens for individual jobs or long-lived ones for repeated use).

In some embodiments, when starting a new entity, a client may be required to provide the new entity with a valid token that the new entity will send to the host production service. The host production service may, in turn, validate the token and respond with a new host identity for the new entity. In some embodiments, this host identity can be automatically added to the layers that are defined on the host production service. Tokens may be provided to new hosts via automation tools such as Puppet, Chef, and Cloud Formation, among others. To create a host using a host production module or the like, a client may not be required to authenticate with the access control system via login name plus API key. Instead, the client may present a token associated with a single host production module or service. Because the token has a specific use, it is a secure way to authorize scripts and code to create hosts in an access-controlled environment such as a cloud computing environment.

Some systems may use object storage with a simple web service interface to store and retrieve data (e.g., Amazon Simple Storage Service™, or S3). Creating a long-lived security token may provide flexibility in the token's distribution to hosts. Tokens may be stored in a trusted location accessible by hosts. For example, tokens may be distributed using configuration management tooling like Chef or Puppet. In some embodiments, if a given system uses AWS™, a token may be encrypted with its Key Management Service (KMS), stored in S3, and used by instances according to their IAM role and instance profile. A token may be configured to always create hosts in the layers specified during the token's creation. The layer(s) granted to new hosts by a host production module or the like may be restricted so that the layer(s) cannot be changed after creation. Thus, if a long-lived token is compromised, the effect of that compromise is limited to only the associated layers in a given infrastructure.

Secrets (e.g., database passwords, cloud credentials and keys) are typically susceptible to attack. The longer a secret remains unchanged, the more vulnerable it becomes. Risk of compromise of a given secret can be mitigated by using a complex secret and changing it often. Implementations of secret rotation in a policy-defined access control system for a cloud computing environment address these considerations by automatically generating and rotating the secrets used to access a target. Each rotator may include a defined duration interval (e.g., for a variable such as a value or other secret data). In some embodiments, the rotator may specify how long a secret or variable retains the same value and may define expiration-cycle attributes. In some embodiments, expiration-cycle attributes may be defined by and stored in a policy. When a variable's expiration point is reached, the variable is updated in the access control system and/or in the access-protected network resource that uses the secret. In some implementations, an administration interface allows administrators to monitor, track, and maintain rotated secrets throughout a given infrastructure.

Policies may be used to manage database access and secrets (e.g., a database password). For example, policies may reduce the threat to secrets' security. If a database is hosted on physical servers or virtual machines (VMs), then a database policy may declare a layer in the same manner as an application. If the database is hosted or managed by an external provider, then login credentials may be the only objects in the policy. Login credentials may be stored as variables, for example:

```
- !policy
    id: mydb-a
    annotations:
      db/engine: postgresql
    body:
    - &variables
    - !variable url
    - !variable username
    - !variable password
    - !permit
      role: !layer /app-a
      privilege: [ read, execute ]
      resource: *variables
```

In some embodiments, applications in a given system may need access to database credentials. In some embodiments, the owner of a resource (e.g., in this example, a variable) controls access by others to the resource. In this example, in the context of a database, the database policy includes !permit statements that allow external policy roles to read and execute the database variables, as shown in the above non-limiting example where the !permit statement uses a path to identify the application(s) that should have access to the database login variables.

Secret rotation may provide automatic rotation of passwords for databases. In some embodiments, the policy format may add annotations that will be identified and used by a rotator. For example, the above non-limiting exemplary database policy can be modified as follows to rotate the database's password each day:

```
- !policy
    id: mydb-a
    body:
    - &variables
      - !variable url
      - !variable username
      - !variable
        id: password
          annotations:
            rotation/rotator: postgresql/password
            rotation/ttl: P1D # 1 day
            rotation/postgresql/password/length: 32
```

In this example, once per day, the access control system will (1) use the current url, username and password to connect to the database, (2) issue an SQL command to change the password to a new 32-byte random string, and (3) store the new password in the password variable. Each rotation event may be written to the access control system audit and displayed in the UI. If there is an error during rotation (e.g., the database cannot be reached or the password is invalid), the error may be written to the audit and the rotator can schedule another rotation attempt (e.g., a rotator can be set to always retry at least twice before the password expires).

Figure 7:
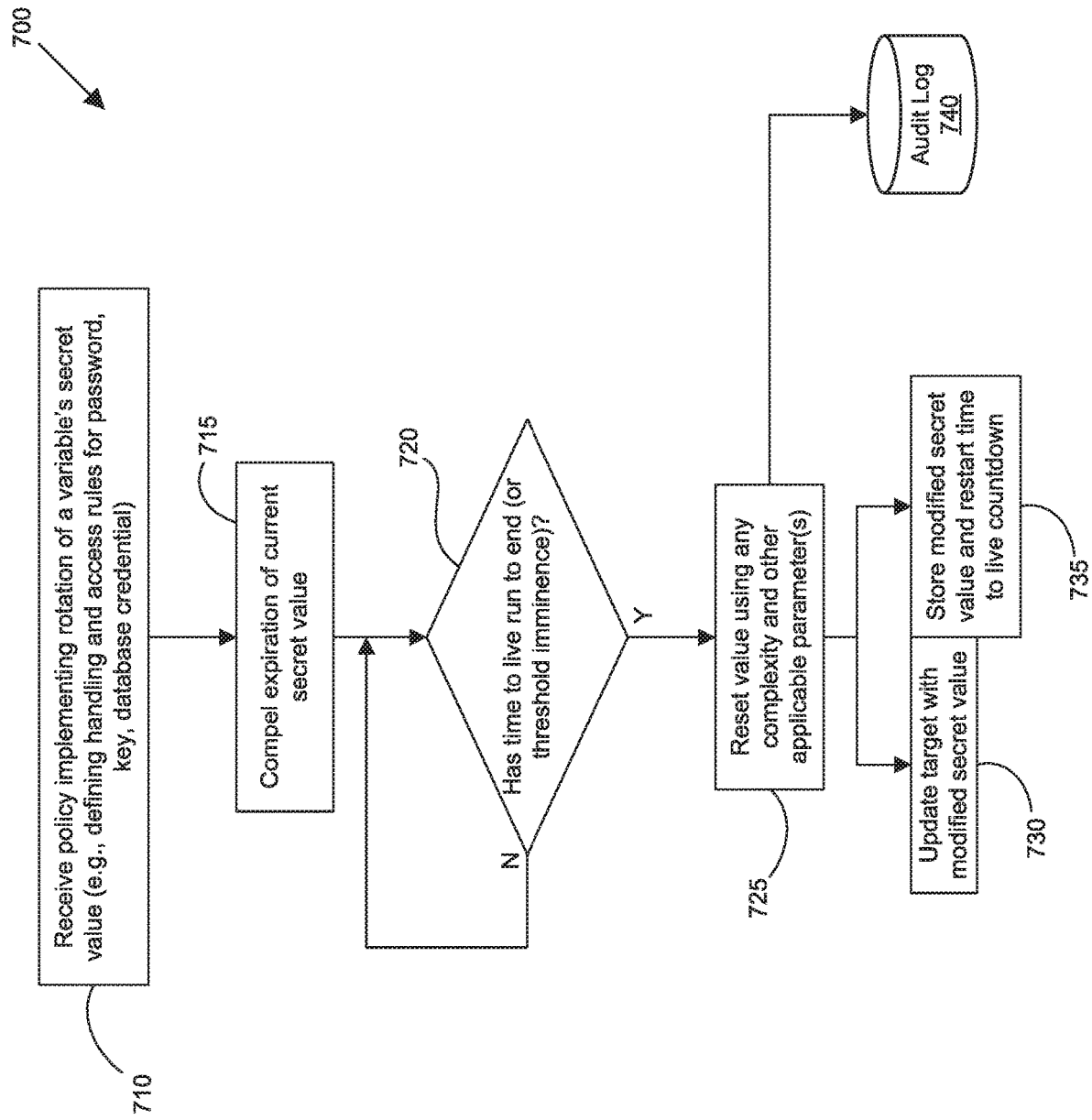
FIG. 7 illustrates a process of an access control system to provide secret rotation in a cloud computing environment.

FIG. 7 illustrates implementations of a process 700 for secret rotation, in accordance with embodiments disclosed herein. Initially, a policy defining secret rotation (e.g., periodically updating/modifying a variable's secret value) is received by an access control system (710). In non-limiting examples, this policy can define the handling and access rules for rotation of password, key, and/or database credentials. The initial secret value is expired (715) to begin the rotation period. If the time to live has not been reached, then the countdown continues. If the time to live has been reached (or is imminent), then (720) the current secret value is reset (725). The reset can include ensuring that a desired complexity level is implemented and that any other applicable parameters are met during modification of the secret value variable. The new value may then be stored in an appropriate location (735) and the access control system target to which the secret value applies is updated (730). Additionally, an audit log 740 may be updated so that past secret values can be retrieved, if necessary, and to provide recordkeeping for compliance and/or other purposes. The process 700 of FIG. 7 can cover the various secret rotation implementations described herein. Further, process 700 can be implemented in the system environments depicted in FIGS. 1, 2, and 3.

Figure 8:
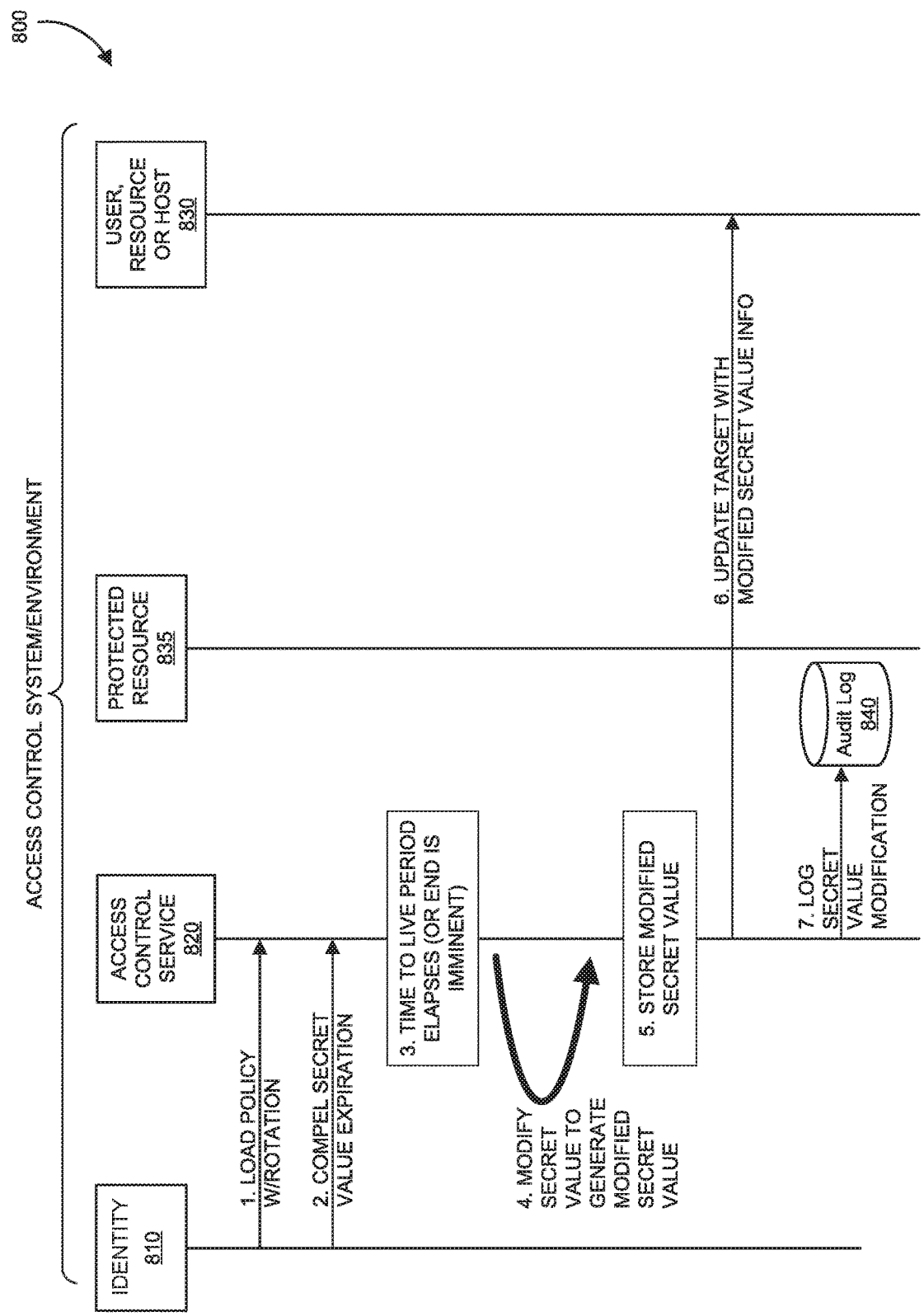
FIG. 8 illustrates operations of a cloud computing environment to provide secret rotation.

FIG. 8 illustrates an operation sequence 800 in which the interactions between actors (an access control service 820, one or more resources 835, and/or one or more identities 810) of a cloud computing environment are managed by access control service 820. A user-defined policy that defines secret rotation may be loaded by identity 810 into access control service 820. Identity 810 may then compel expiration of the initial secret value to begin the time to live period countdown. When that time limit is reached (or is imminent), the secret value is modified to generate a modified secret value that is then stored. The target to which the secret value applies is then modified to update that host 830, resource, etc. and an audit log 840 is updated as well. The process 800 of FIG. 8 can cover the various secret rotation implementations described herein. In addition, process 800 can be implemented in the system environments depicted in FIGS. 1, 2, and 3.

In some embodiments, applications may need to use API keys for third party services. For example, a job may be making API calls to a cloud provider and these secrets can be managed as described above regarding database passwords. This can include rotation of the relevant secret(s) pertaining to each API key in some implementations.

Many secrets require rotation (e.g., passwords, keys, certificates). In some embodiments, secret rotation in an access control system may include one or more prebuilt rotators that integrate rotation functionality into the policies for secrets. Each rotator may replace authentication parameters contained in a secret variable (expired or not) with new, automatically generated values. A monitoring module may watch for expiration-event notifications from the access control system's variable-expiration service. When an expiration event (e.g., denoting that a variable has expired or that expiration is imminent) appears in the audit log for a variable that has a policy-defined rotation function, the associated secret can be set to a new, unique value (with suitable complexity in some implementations). If rotation fails (e.g., due to a network or server failure), the failure event is logged and a message can be attached to the audit record stored in audit log 840.

In some embodiments, the rotator service may run on an access control system host, and rotation may be applied and/or available to any target (e.g., a system, resource or application) where the access control system has administrative credentials. To perform rotation of one or more secrets in a target system, the access control system may have access to a credential with sufficient privilege to perform a secret reset or update in the target (e.g., a password reset or the like). For example, an administrative credential for the target may be loaded into an access control system rotation module variable. This administrative credential may be used by the rotator to change the password of any user or account in the target, and to store the new secret. Secrets may be stored, for example, in an encrypted secrets storage location/device and/or in a rotated access control system rotation module variable. In some embodiments, a cloud "root" account may be used to manage authentication credentials of another cloud account.

In another example, the secret in the rotated variable may itself be powerful enough to perform a password reset or update in the target (e.g., database user accounts may change their own passwords, but not the passwords of other database users). This example does not require the access control system rotation module to store a "super user" password or other credential for the target. If the access control system rotation module does store a super user password or other credential, it may be rotated as well. If the access control system is bootstrapped, a default rotator role can be implemented that has sufficient privileges to provide access to any variable except for those that have been retired.

In some embodiments, rotation may be enabled by including and/or adding annotations to a variable in a policy. For example, the annotation "rotation/ttl" defines how long a variable uses the same value before rotation (time-to-live). Various standards can be considered in setting duration (e.g., the ISO8601 duration format can be employed—under this format, "P1D" represents a duration period (P) of one (1) day (D)). Additionally, the annotation "rotation/rotator" can define the specific rotator to be used for a given secret's rotation. Some secret rotation implementations may require or benefit from additional annotations.

After annotating a variable for rotation, automatic rotation may be initiated by expiring the variable to trigger the first countdown to rotation based on the secret's rotation/ttl annotation. A variable may be expired by an appropriately authorized administrative user using an access control system CLI or API.

Non-limiting examples of rotators include AWS secret access key rotation, PostgreSQL database password rotation, token (S3) rotation for tokens generated by a host production module or the like, SSH key pair rotation (rotating through a bastion), and SSH pubkey rotation.

One non-limiting example of a rotation module implementation (and/or a rotation service implemented in an access control system for a cloud computing environment) includes rotation of Amazon Web Services™ (AWS) Identity and Access Management (IAM) credentials for an IAM user to ensure that the user always has two active keys, thus avoiding a race condition in which a client using an old credential may be unable to authenticate to a target AWS system because the credential has been rotated out. In some embodiments of secret rotation in an access control system, a variable stores a history of its values (e.g., up to 20 prior values) and keeps track of both the most-recent AWS credential being rotated out, as well as the new credential, while a user only has to deal with a single variable. In this example, the user may be required to have certain IAM privileges on its own record or policy (e.g., iam:CreateAccessKey, iam:ListAccessKeys, iam:DeleteAccessKey) and the rotator can require the existence of three variables: the AWS region, the access key ID, and the secret access key (which may be the only variable configured with rotation annotations). A policy may then be loaded defining the required variables with a common prefix and annotations, for example:

```
- !policy
    id: aws
    body:
        - !variable region
        - !variable access_key_id
        - !variable secret_key_proxy
        - !variable
            id: secret_access_key
            annotations:
                rotation/rotator: aws/ secret_key
                rotation/ttl: P1D # 1 day
```

If a proxy is required to access AWS, the secret_key_proxy variable may contain the name of another variable that holds the proxy information. An AWS user with permission to create, list, and delete access keys may then be created, as are access keys, which may then be stored with the access control system, along with any required proxy information. The secret_access_key value's expiration may then be compelled to trigger rotation and the secret_access_key value may then be used knowing that the value will be rotated once a day. In the event that rotation fails, a "retry period" may be established (e.g., 0.4 of the original ttl period) and the rotation may be retried until successful or on a more limited basis.

In another example of secret rotation, a user's PostgreSQL database password may be rotated to a random value. The target for such a rotation may be defined by convention, creating variables sharing a common prefix. For example, a "url" variable can be designated for the host endpoint of the database, including port and database name (e.g., "dbcluster.myorg.com:5432/reports"). Likewise, a "username" variable can designate the database user (e.g., "budgeting") and a "password" variable can designate a database password to be rotated (e.g., "initialpass"). Again, the password variable may be annotated with "rotation/rotator" and "rotation/ttl" (along with a "length" that identifies the number of characters each new password must have). An example of a policy implementing such a PostgreSQL database password rotation is:

```
- !policy
    id: db/reports
    body:
        - &variables
        - !variable url
        - !variable username
        - !variable
            id: password
            annotations:
                rotation/rotator: postgresql/password
                rotation/ttl: P1D # 1 day
                rotation/postgresql/password/length: 32
```

Values can also be set for the variables used in the rotation (e.g., url is "dbcluster.myorg.com:5432/reports"; username is "budgeting"; and password is "initialpass"). A PostgreSQL identity and database may be created if they do not already exist. The password value's expiration may be compelled to trigger rotation and the password value may then be used to log into PostgreSQL (e.g., by setting an environment variable with CLI available in the access control system). In this example, the password value will be rotated once a day and rotation failure can be addressed as discussed above.

Difficulties can be encountered in connecting commercial web services for hosting applications (e.g., Amazon Elastic Compute Cloud™, or "EC2"). Some implementations of secret rotation can make it simple to use a host production module and/or service along with Amazon™ IAM Instance Roles to enroll machines and govern their roles, SSH permissions, and access to secrets in a given access control system. On the AWS side, each EC2 instance can be launched with an IAM role via EC2 Instance Profile selection. The machine's role may have permission to fetch a host production module token (e.g., from an S3 file). The token can be placed in S3 by one of the rotators discussed herein and updated regularly. The token can also have an IP address or Classless Inter-Domain Routing (CIDR) restriction to further restrict its utilization (e.g., to a specific subnet within an EC2 Virtual Private Cloud (VPC)). Once the instance has fetched the token, it can be presented to the host production module or service, which enrolls the host into a layer configuration (e.g., to govern secrets, SSH, and traffic authorization permissions). The host production module or service can also issue a machine identifier and refresh token (e.g., API key) which the host can use to authenticate itself to the access control system. In this way, Amazon™ IAM and an access control system can work together to ensure that actions performed by and on the machine are properly authorized and audited.

In some embodiments, the rotator can periodically generate a token and store it (e.g., in an S3 file). The rotator may also create an IAM role and grant the role permission to read the token file. On startup, an EC2 instance may use EC2 metadata to determine its IAM role name, construct a file path from the role name, fetch the token from S3, and then use the token to enroll with the access control system.

Another non-limiting example of secret rotation can be configured to rotate SSH key pairs. In some embodiments, shared SSH keys may be used for access to one-off or "special" machines in a given infrastructure. For example, a Jenkins master or bastion host may use a private/public SSH key pair that is shared among multiple users for intermittent access. Such shared keys can pose a security risk if they are not rotated frequently. Some compliance frameworks may require that an administrative SSH user be able to access certain machines at any time. A rotator for the SSH key pair may solve this problem by rotating a shared SSH private key on a set schedule so that shared private keys are regularly rotated and private key access can be audited. This rotator can connect to a remote machine (optionally, through a bastion host) using an existing SSH private key (e.g., stored in the access control system), create a new SSH key pair (e.g., appending the new public key to a host user's file), update the private-key variable with the new private key's value, and overwrite the host user's file so that the file contains only the new public key. This type of rotator may be set up by creating variables with a common prefix. For example, a "host" variable can designate the host into which to establish an SSH connection (e.g., "bastion01.myorg.com"). Likewise, a "port" variable can designate the SSH port for the host (e.g., "23"); a "login" variable can designate the username to use for SSH access (e.g., "ubntu"); and a "private-key" variable can designate the content of the private SSH key (e.g., "BEGIN RSA PRIVATE KEY"). When a policy format is used as described herein, then the "private-key" variable may need to be annotated with "rotation/rotator" and "rotation/ttl" (along with a "length" that identifies the number of bits to generate for each new key in some implementations, e.g. "2048").

In some embodiments, operations team members may occasionally need to SSH onto an Ubuntu build machine (e.g., to perform maintenance tasks) using a shared private SSH key. A policy can be loaded defining the required variables with a common prefix and annotations:

```
# builders.yml
- !policy
  id: builders
  body:
  - !policy
    - !variable host
    - !variable port # optional, default=22
    - !variable login
    - !variable
      id: private-key
      annotations:
        rotation/rotator: ssh/key_pair
        rotation/ttl: P1W # rotate every week
        rotation/ ssh/key_pair/length: "2048" # optional default=2048
```

The variables' values may be set and the "private-key" variable's expiration is compelled to trigger initial rotation. The private-key may then be used to access the machine. If the target host is only accessible (resolvable, reachable) through a bastion host, a policy may be defined using a private-key and associated variables (e.g., host, port, login) for the bastion host. A jump-proxy-key variable value may be set on the target host to the unqualified ID of the bastion private-key variable causing the rotator to proxy the connection to the target host through the bastion using that private key. In some embodiments, the private-key variable of the bastion can also be rotated. A single policy may be constructed that internally defines two policies (i.e., a policy addressing access control relating to two different targets, a primary target and a second (gateway) target like a bastion host)—one defining the hostname and SSH credentials for the bastion host and one defining hostname, SSH credentials, rotation configuration and bastion key reference for the target host.

Another non-limiting example may be illustrated in connection with private/public keys for SSH access. Using private/public keys for SSH access has many advantages over using passwords. For example, passwords are often hard to remember, can be compromised by brute-force attacks, and are often reused for different services (increasing threat surface). A pubkey service of the access control system can allow users to associate public SSH keys with their access control system account, making it easy for administrators to grant and revoke SSH access through entitlements. In some embodiments, entitlements are roles and permissions that span all policies and global records. SSH keys are not immune to compromise, however, and thus are good candidates for rotation on a regular schedule. An implementation of secret rotation for SSH pubkey rotation can facilitate rotation of SSH keys associated with an access control system user automatically on a preselected schedule. In some embodiments, both the private and public keys are rotated. The rotator can create a new private SSH key (e.g., updating an access control system variable with a new value), can create a new public SSH key from the updated private SSH key, and can upload the new public SSH key to an access control system pubkey service (e.g., associating it with a specified user).

In the above example, the rotator can be set up by creating variables with a common prefix. For example, a "user" variable can designate the access control system user (e.g., "dan.smith"). Likewise, a "key_name" variable can designate the name of the public key in the access control system's pubkeys service (e.g., "dan.smith@myorg.com") and a "private_key" variable can designate the content of the private SSH key (e.g., "BEGIN RSA PRIVATE KEY"). If a policy format is used as described herein, then the "privatekey" variable may need to be annotated with "rotation/rotator" and "rotation/ttl" (along with a "length" that identifies the number of bits to generate for each new key in some implementations, e.g. "2048"). A policy can be loaded defining the required variables with a common prefix and annotations:

```
# Create the rotation variables
- !policy
  id: pubkey/dan.smith
  body:
  - &variables
    - !variable user
    - !variable key_name
    - !variable
      id: private_key
      annotations:
        rotation/rotator: ssh/pubkey
        rotation/ttl: P1W # rotate every week
        rotation/ssh/key_pair/length: "2048" # optional default=2048
# Allow the user to fetch the variables
- !permit
  role: !user /dan.smith # forward-slash designates a global role in system
  privilege: [read, execute]
  resource: *variables
```

The variable values in the policy may be set and rotation triggered by compelling expiration of the private_key variable. Both the public and private keys are then rotated and can be checked. The new private key can be used to access machines configured with the access control system's SSH.

Rotation information can be made available via a UI dashboard or the like that allows administrators to view rotated secrets, to examine details of a specific rotation, to perform rotations on an ad hoc basis, and/or to schedule rotations. Additionally, in some embodiments, rotation results can be audited automatically. Such results may be appended to an entity's auditing and logging tool when the access control service is provided in that mode and is integrated with the access control system's audit API. Other additions and variations may also be provided.

Figure 9:
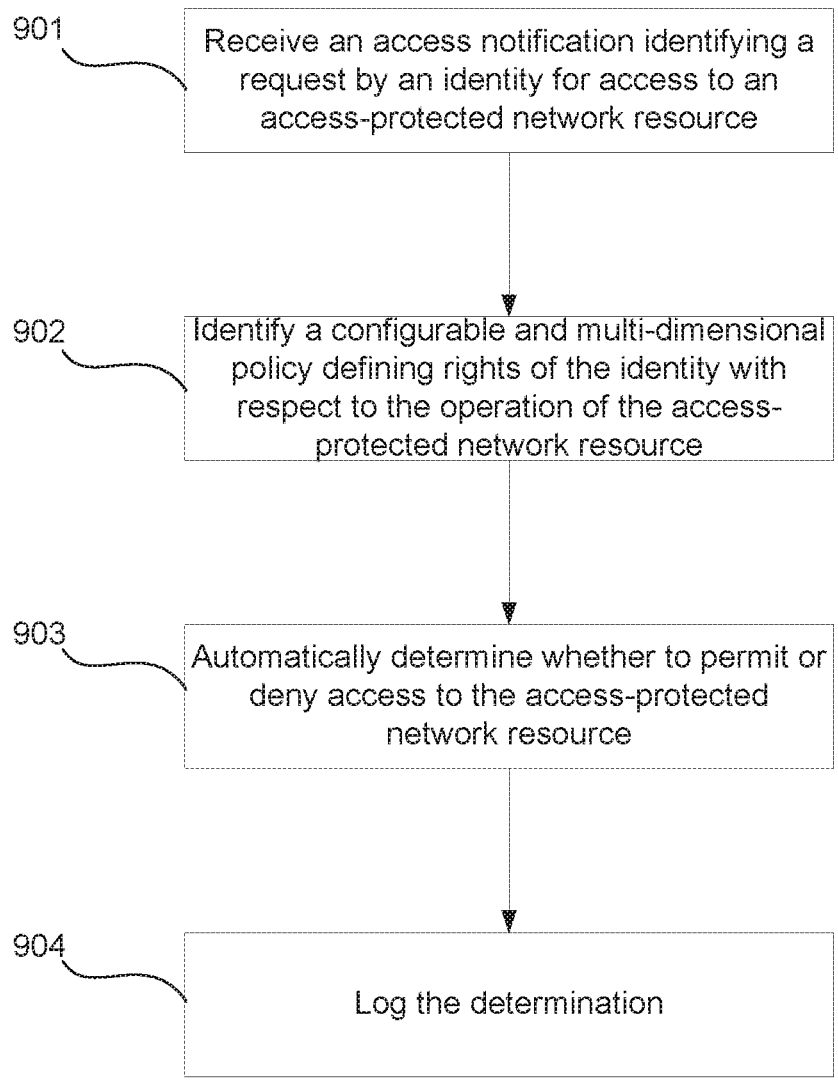
FIG. 9 illustrates a process of an access control system to provide policy-defined access control in a cloud computing environment.

FIG. 9 illustrates a method 900 for dynamically providing access control in a network environment, e.g., environments 100, 200, or 300, as discussed above. At step 901, the access control system, e.g., access control system 121, 220, 320, may receive an access notification identifying a request by an identity for access to an access-protected network resource. As previously described, an identity may be associated with a natural or legal person (e.g., an individual or a company), a physical computing resource (e.g., a server or computing device, etc.), or a logical object (e.g., a database, a network account, an application, IP address, an endpoint, etc.) associated with certain rights, services, credentials, and/or descriptive information in the context of a cloud-computing environment. For example, end-users (e.g., end-users 141, 341), personnel (e.g., personnel 147, 148, 347, 348), network resources (e.g., resources 101-105), and other servers, databases, or computing devices may each be associated with identities. In some embodiments, the identity and the access-protected network resource operate in a zero-trust secret management environment, where as a default policy identities and resources do not trust any other identities or resources, regardless of whether they are in the same or another network environment. In such zero-trust environments, there is no guaranteed trust available between identities or resources, and thus other authentication or authorization techniques are required to limit access to sensitive assets.

An access notification may identify a request by an identity to access an access-protected resource. In some embodiments, the access notification requests a particular type of access to the access-protected network resource. For example, the particular type of access may be at least one of read, modify, or delete. As an example, an employee of an entity may request access to an access-protected program file, specifying he wishes to modify the file.

At step 902, the system identifies a configurable and multi-dimensional policy defining rights of the identity to access the access-protected network resource with respect to the operation of the access-protected resource. The configurable and multi-dimensional policy may, as discussed above, specify one or more access-protected network resources, including the access-protected network resource. In some embodiments, the policy may also specify one or more policy variables, such as those discussed above. Further, the policy may specify one or more permissions corresponding to the policy variables. In some embodiments, the policy owner is an administrator identity. Policy variables, as discussed above, may include secret expiration parameters, secret rotation instructions, permissions, roles, or groups.

In some embodiments, the configurable and multi-dimensional policy is stored as a declarative document. For example, the declarative document may be at least one of a YAML file, a JSON file, or an XML file. As previously discussed, YAML, JSON, and XML are human-readable data serialization languages able to be read in a variety of network environments without modification to the code.

As previously discussed, identities (e.g., users, applications, or other network resources) may be assigned to one or more groups, e.g., "developer," "test," "production," etc. In some embodiments, the configurable and multidimensional policy further specifies a group to which an identity belongs. As discussed above, groups may be standalone or nested with sub-groups. In some embodiments, the system maintains one or more configurable and multi-dimensional policies for different identities. The configurable and multi-dimensional policies may be categorized into one or more of groups. In some embodiments, upon an instantiation of the different identities, the configurable and multi-dimensional policies are assigned to the different identities. In some embodiments, the configurable and multi-dimensional policy is unique to the identity.

At step 903, the system automatically determines whether to perform at least one of various different defined operations. The operations may include, for example, permitting the identity to access the access-protected network resources, denying the identity to access the access-protected network resource, or rotating a secret associated with the identity.

At step 904, the system may log the determination of whether the entity should be permitted to access the access-protected network or denied to access the access-protected network. For example, the system may log one or more records in an audit log 272, 540, 680, 740, 840 or audit receiver 274, as discussed above. In some embodiments, audit records may be used for permission checks, analysis of historical data, and/or audit reporting.

Figure 10:
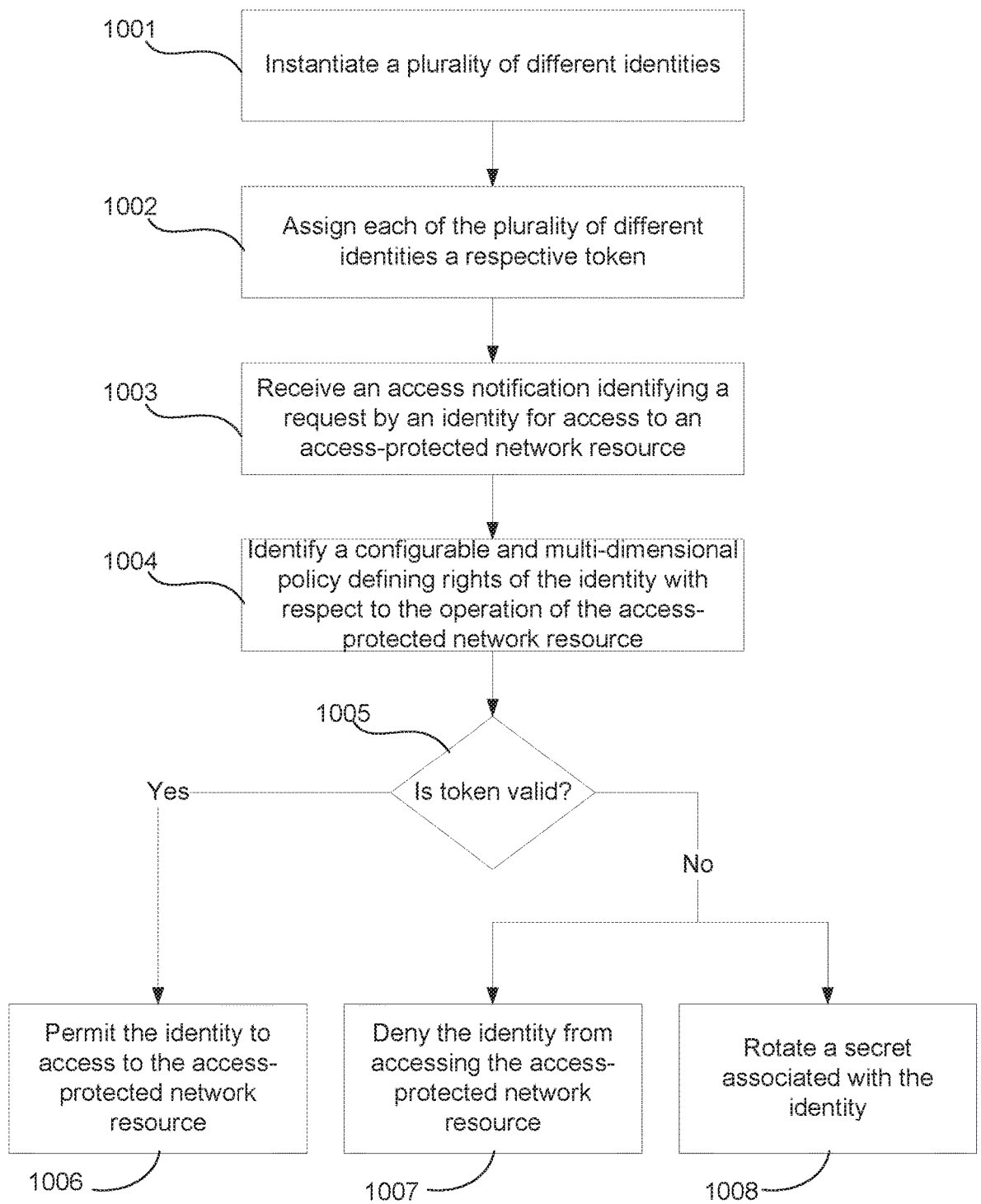
FIG. 10 illustrates a process of an access control system to provide policy-defined access control in a cloud computing environment.

FIG. 10 illustrates an exemplary method 1000 for providing access control in a network environment. In accordance with above embodiments, method 2000 may be performed in the system environments of FIG. 1, 2, or 3. At step 1001, the system instantiates one or more different identities. This may occur, for example, when new identities are spawned in a cloud environment (e.g., AWS, Google, etc.). For example, identities may be instantiated for new users within the network environment, such as new employees. Further, identities may be instantiated according to assets such as databases, applications, servers, etc.

At step 1002, upon instantiation of the different identities, each of the plurality of different identities is assigned a respective token. In some embodiments, steps 1001 and 1002 may occur simultaneously. A token may be generated, for example, by a host production module or other automation tool.

At step 1003, the access control system may receive an access notification identifying a request by an identity for access to an access-protected network resource as previously described with reference to FIG. 9.

At step 1004, the system identifies a configurable and multi-dimensional policy defining rights of the identity to access the access-protected network resource with respect to the operation of the access-protected resource, as previously described with respect to FIG. 9.

At step 1005, the system automatically determines, based on whether the respective tokens are valid, whether to perform at least one of various defined operations. The operations may include permitting the identity to access the access-protected network resources, denying the identity to access the access-protected network resource, or rotating a secret associated with the identity. As previously described, tokens may be short- or long-lived and may be created with one or more expiration parameters governing the validity of the token. For example, a token may expire after a defined period of time.

If the token associated with the requesting identity is valid, the identity may be permitted to access the access-protected network resource (step 1006). If the token associated with the requesting identity is invalid, e.g., the token has expired, the identity may be denied to access the access-protected network resource (step 1007). In some instances, if the token associated with the requesting identity is invalid, the system may rotate the token as previously described (step 1008).

Figure 11:
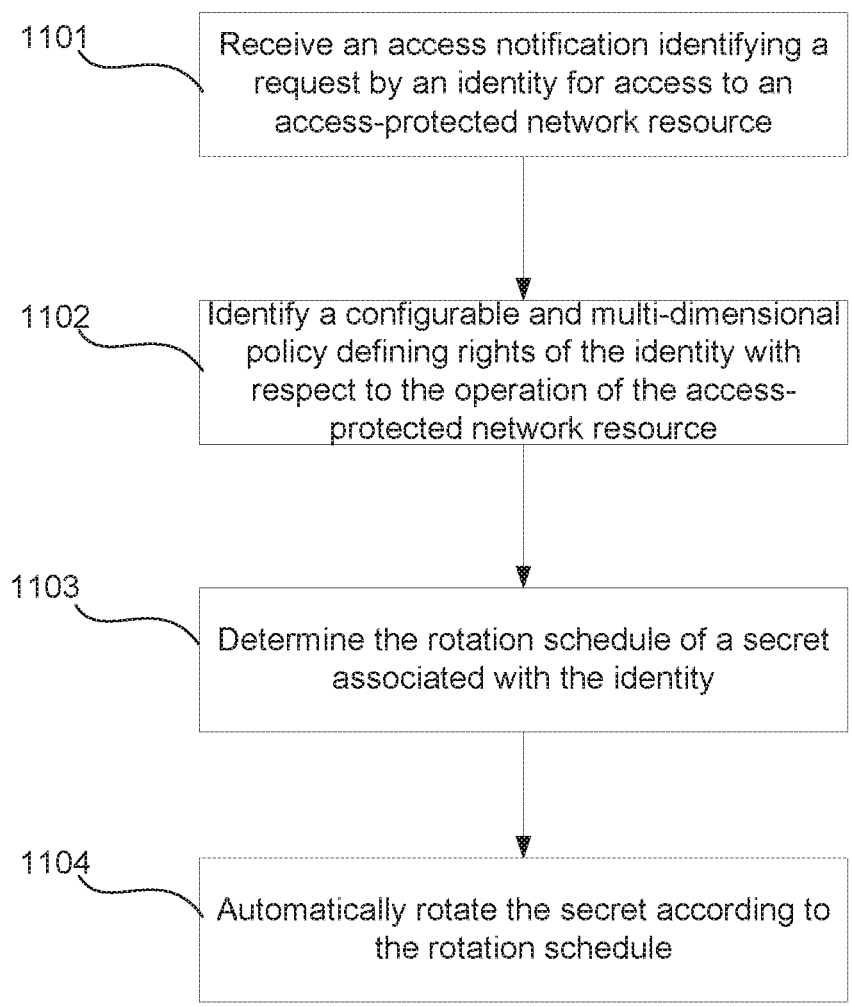
FIG. 11 illustrates a process of an access control system to rotate secrets in a cloud computing environment.

FIG. 11 illustrates an exemplary method 1100 for rotating a secret in a network environment. Method 1100 may be performed in the system environments described above in connection with FIGS. 1, 2, and 3. At step 1101, the access control system may receive an access notification identifying a request by an identity for access to an access-protected network resource, as previously described with reference to FIG. 9.

At step 1102, the system identifies a configurable and multi-dimensional policy defining rights of the identity to access the access-protected network resource with respect to the operation of the access-protected resource, as previously described with respect to FIG. 9.

At step 1103, the system determines a rotation schedule for a secret associated with the identity. For example, a rotation schedule for a secret may be defined by the configurable and multi-dimensional policy. As previously described, a policy may include one or more variables defining a rotation schedule for one or more secrets associated with an identity. For example, a policy may include annotations defining a secret length and rotation schedule to be used by a rotator. A rotation schedule may include a rotation variable defining rotation period. Other rotation schedules may define, for example, a number of times the secret may be used before rotation.

At step 1104, the system may automatically rotate the secret according to the rotation schedule. For example, the system may query one or more databases and/or audit logs to determine when the secret was previously updated or how many times the secret has been used by the identity. If the secret rotation schedule defines a rotation period of one day, the system may rotate the secret every day according to the rotation schedule.

FIG. 12 illustrates a computing system 1200 that is representative of any apparatus, system, or collections thereof suitable for implementing an access control service, access control node, a cloud computing resource, interface, user terminal or all of the above. Computing system 1200 is suitable for implementing access control nodes 131-137, 331, 332, 337, 338. Access control service 1220 is representative of access control service 121, 220, 320, 620 and/or 820, as described above.

Examples of computing system 1200 include server computers, rack servers, web servers, cloud computing platforms, and data center equipment, as well as any other type of physical or virtual server machine, and any variation or combination thereof. In some embodiments, a collection of multiple computing systems may be employed to implement all or portions of access control service 1220, which may be hosted in one or more data centers, virtual data centers, or any other suitable computing facilities.

Computing system 1200 may be a single apparatus, system, or device, or may be implemented in a distributed manner as multiple apparatuses, systems, or devices. Computing system 1200 may include communication interface system 1201, processing system 1203, and user interface 1202. In some examples, user interface 1202 may be omitted. Processing system 1203 may be linked to communication interface system 1201 and user interface 1202. Interfaces 1201 and 1202 may be similar to interface 400, as described above in connection with FIG. 4. Processing system 1203 includes processing circuitry 1205 and storage system 1206 (which can include one or more memory devices or the like) that stores software 1207.

Processing system 1203 loads and executes software 1207 from storage system 1206. When executed by processing system 1203 to implement access control service 1220 (including one or more of policy-defined access control 1222 and/or secret rotation 1224), software 1207 directs processing system 1203 to operate as described herein for the various access control services discussed in the foregoing implementations. Computing system 1200 may optionally include additional devices, features, or functionality not discussed for purposes of brevity.

Processing circuitry 1205 comprises microprocessor and other circuitry that retrieves and executes operating software 1207 from storage system 1206. Storage system 1206 comprises a non-transitory storage medium, such as a disk drive, flash drive, data storage circuitry, or some other memory apparatus. Processing circuitry 1205 is typically mounted on a circuit board that may also hold storage system 1206 and portions of communication interface 1201 and user interface 1202. Operating software 1207 comprises computer programs, firmware, or some other form of machine-readable processing instructions. Operating software 1207 includes access control service module 1220, although any number of software modules may provide the same operation. Operating software 1207 may further include an operating system, utilities, drivers, network interfaces, applications, or some other type of software. When executed by processing circuitry 1205, operating software 1207 directs processing system 1203 to operate computing system 1200 as described herein. In particular, access control service module 1220 can include the capabilities of performing and/or overseeing the receiving, loading, storing, utilization and updating of policy-defined access control policies, as well as performing and/or overseeing secret rotation.

Referring still to FIG. 12, processing system 1200 may comprise a microprocessor and other circuitry that retrieves and executes software 1207 from storage system 1206. Processing system 1203 may be implemented within a single processing device, but may also be distributed across multiple processing devices or sub-systems that cooperate in executing program instructions. Examples of processing system 1203 include general purpose central processing units, application specific processors, and logic devices, as well as any other type of processing device, combinations, or variations thereof.

Storage system 1206 may comprise any computer readable storage media readable by processing system 1203 and capable of storing software 1207. Storage system 1206 may include a non-transitory storage medium, non-limiting examples of which include volatile and nonvolatile, removable and non-removable media implemented in any method or technology for storage of information, such as computer readable instructions, data structures, program modules, or other data. Examples of such storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations, storage system 1206 may also include computer readable communication media over which software 1207 may be communicated internally or externally. Storage system 1206 may be implemented as a single storage device but may also be implemented across multiple storage devices or sub-systems co-located or distributed relative to each other. Storage system 1206 may comprise additional elements, such as a controller, capable of communicating with processing system 1203 or possibly other systems.

Software 1207 may be implemented in program instructions and among other functions may, when executed by processing system 1203, direct processing system 1203 to operate as described herein with respect to the various operational scenarios, sequences, and processes discussed above. In particular, the program instructions may include various components or modules that cooperate or otherwise interact to carry out the various processes and operational scenarios described herein. The various components or modules may be embodied in compiled or interpreted instructions or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 1207 may include additional processes, programs, or components, such as operating system software or other application software. Software 1207 may also comprise firmware or some other form of machine-readable processing instructions executable by processing system 1203.

In general, software 1207 may, when loaded into processing system 1203 and executed, transform a suitable apparatus, system, or device (of which computing system 1200 is representative) overall from a general-purpose computing system into a special purpose computing system customized to facilitate run-time experimentation with user interface configurations as described herein for each implementation. Indeed, encoding software 1207 on storage system 1206 may transform the physical structure of storage system 1206. The specific transformation of the physical structure may depend on various factors in different implementations of this description. Examples of such factors may include, but are not limited to, the technology used to implement the storage media of storage system 1206 and whether the computer-storage media are characterized as primary or secondary storage, as well as other factors.

For example, if the computer readable storage media are implemented as semiconductor-based memory, software 1207 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

It should be understood that computing system 1200 is generally intended to represent a computing system or systems on which software 1207 may be deployed and executed in order to implement access control services in a cloud computing environment. However, computing system 1200 may also be suitable as any computing system on which software 1207 may be staged and from where software 1207 may be distributed, transported, downloaded, or otherwise provided to yet another computing system for deployment and execution, or yet additional distribution.

Communication interface system 1201 may include communication connections and devices that allow for communication with other computing systems (not shown) over a communication network or collection of networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing system 1200 and any other computing system (not shown) may occur over a communication network or networks and in accordance with various communication protocols, combinations of protocols, or variations thereof. Examples of communication networks over which computing system 1200 may exchange information with other computing systems include intranets, the Internet, local area networks, wide area networks, wireless networks, wired networks, virtual networks, software defined networks, data center buses, computing backplanes, networks, or any combination or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof. In some implementations, information may be exchanged in accordance with any of a variety of email protocols, including without limitation POP (Post Office Protocol), IMAP (Internet Message Access Protocol), MAPI (Messaging Application Programming Interface), HTTP mail, or any other suitable email protocol.

User interface system 1202 may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 1202. In some cases, the input and output devices may be combined in a single device, such as a display capable of displaying images and receiving touch gestures. The aforementioned user input and output devices are well known in the art and need not be discussed at length here.

User interface system 1202 may also include associated user interface software executable by processing system 1203 in support of the various user input and output devices discussed above. Separately or in conjunction with each other and other hardware and software elements, the user interface software and user interface devices may support a graphical user interface, a natural user interface, or any other type of user interface. In addition, user input made with respect to the user interfaces can be input via user interface system 1202.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials will be developed and the scope of the these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for dynamically providing access control in a network environment, the operations comprising:
   receiving an access notification identifying a request by an identity for access to an access-protected network resource;
   identifying a configurable and multi-dimensional policy defining rights of the identity to access the access-protected network resource, the configurable and multi-dimensional policy specifying:
      a plurality of access-protected network resources, including the access-protected network resource;
      a policy owner capable of configuring the configurable and multi-dimensional policy;
      a plurality of policy variables for controlling access to the access-protected network resource, wherein the plurality of policy variables include at least one of secret expiration annotations, permissions, roles, groups, or definitions of secret rotation instructions, and wherein the secret expiration annotations include a time to live;
      a plurality of permissions corresponding to the plurality of policy variables; and
      a determination of whether to compel a rotation instruction based on the secret expiration annotations;
   automatically determining, based on the configurable and multi-dimensional policy, whether to perform at least one of:
      permitting the identity to access the access-protected network resource;
      denying the identity to access the access-protected network resource; or
      rotating a secret associated with the identity;
   upon determining that the time to live is reached, generating a modified secret value; and
   applying the modified secret value to the access-protected network resource.

2. The non-transitory computer readable medium of claim 1, wherein the identity and the access-protected network resource operate in a zero-trust secret management environment.

3. The non-transitory computer readable medium of claim 1, wherein the configurable and multi-dimensional policy further specifies a group to which the identity belongs.

4. The non-transitory computer readable medium of claim 1, wherein the configurable and multi-dimensional policy is stored as a declarative document.

5. The non-transitory computer readable medium of claim 4, wherein the declarative document is at least one of a YAML file, a JSON file, or an XML file.

6. The non-transitory computer readable medium of claim 1, wherein the policy owner is an administrator identity.

7. The non-transitory computer readable medium of claim 1, wherein the operations further comprise rotating the secret associated with the identity according to a defined rotation schedule.

8. The non-transitory computer readable medium of claim 1, wherein the access notification requests a particular type of access to the access-protected network resource.

9. The non-transitory computer readable medium of claim 8, wherein the particular type of access is at least one of read, modify, or delete.

10. The non-transitory computer readable medium of claim 1, wherein the operations further comprise logging the determination of whether the identity should be permitted to access the access-protected network resource or denied to access the access-protected network resource.

11. The non-transitory computer readable medium of claim 1, wherein the configurable and multi-dimensional policy is unique to the identity.

12. A computer-implemented method for dynamically providing access control in a network environment, the method comprising:
   receiving an access notification identifying a request by an identity for access to an access-protected network resource;
   identifying a configurable and multi-dimensional policy defining rights of the identity to access the access-protected network resource, the configurable and multi-dimensional policy specifying:
      a plurality of access-protected network resources, including the access-protected network resource;
      a policy owner capable of configuring the configurable and multi-dimensional policy;
      a plurality of policy variables for controlling access to the access-protected network resource, wherein the plurality of policy variables include at least one of secret expiration annotations, permissions, roles, groups, or definitions of secret rotation instructions, wherein the secret expiration annotations include a time to live;
      a plurality of permissions corresponding to the plurality of policy variables; and
      a determination of whether to compel a rotation instruction based on the secret expiration annotations;
   automatically determining, based on the configurable and multi-dimensional policy, whether to perform at least one of:
      permitting the identity to access the access-protected network resource;
      denying the identity to access the access-protected network resource; or
      rotating a secret associated with the identity;
   upon determining that the time to live is reached, generating a modified secret value; and
   applying the modified secret value to the access-protected network resource.

13. The computer-implemented method of claim 12, wherein the identity and the access-protected network resource operate in a zero-trust secret management environment.

14. The computer-implemented method of claim 13, wherein the configurable and multi-dimensional policy is stored as a declarative document.

15. The computer-implemented method of claim 14, wherein the declarative document is at least one of a YAML file, a JSON file, or an XML file.

16. The computer-implemented method of claim 13, further comprising rotating the secret associated with the identity according to a defined rotation schedule.

17. The computer-implemented method of claim 13, wherein the access notification requests a particular type of access to the access-protected network resource.

18. The computer-implemented method of claim 12, further comprising maintaining a plurality of configurable and multi-dimensional policies for a plurality of different identities.

19. The computer-implemented method of claim 18, wherein the plurality of configurable and multi-dimensional policies are categorized into a plurality of groups.

20. The computer-implemented method of claim 18, wherein upon an instantiation of the plurality of different identities, the plurality of configurable and multi-dimensional policies are assigned to the plurality of different identities.

21. The computer-implemented method of claim 18, wherein upon an instantiation of the plurality of different identities, each of the plurality of different identities is assigned a respective token.

22. The computer-implemented method of claim 21, wherein the automatically determining is based on whether the respective tokens are valid.

* * * * *